US009260202B2

(12) United States Patent
Shachor et al.

(10) Patent No.: US 9,260,202 B2
(45) Date of Patent: Feb. 16, 2016

(54) AERIAL UNIT AND METHOD FOR ELEVATING PAYLOADS

(71) Applicants: Gabriel Shachor, Maccabim Reut (IL); Shy Cohen, Yokneam moshava (IL); Ronen Keidar, Yokneam moshava (IL)

(72) Inventors: Gabriel Shachor, Maccabim Reut (IL); Shy Cohen, Yokneam moshava (IL); Ronen Keidar, Yokneam moshava (IL)

(73) Assignee: SKY SAPIENCE LTD., Yokneam (IL)

( * ) Notice: Subject to any disclaimer, the term of this patent is extended or adjusted under 35 U.S.C. 154(b) by 227 days.

(21) Appl. No.: 13/847,583

(22) Filed: Mar. 20, 2013

(65) Prior Publication Data
US 2013/0313364 A1 Nov. 28, 2013

Related U.S. Application Data

(63) Continuation-in-part of application No. 13/814,244, filed as application No. PCT/IB2011/055021 on Nov. 10, 2011, now Pat. No. 8,695,919.

(60) Provisional application No. 61/412,816, filed on Nov. 12, 2010.

(51) Int. Cl.
B64C 27/08 (2006.01)
B64C 27/20 (2006.01)
(Continued)

(52) U.S. Cl.
CPC . *B64F 1/12* (2013.01); *B64C 27/04* (2013.01); *B64C 27/08* (2013.01); *B64C 29/04* (2013.01); *B64C 39/022* (2013.01); *B64C 39/024* (2013.01); *B64C 2201/027* (2013.01); *B64C 2201/108* (2013.01); *B64C 2201/122* (2013.01);
(Continued)

(58) Field of Classification Search
CPC ......... B64C 27/08; B64C 27/20; B64F 1/007; B64F 1/12; B64F 1/125
USPC .......... 244/17.11, 17.17, 17.19, 17.21, 17.23, 244/23 A, 23 C, 115, 116
See application file for complete search history.

(56) References Cited

U.S. PATENT DOCUMENTS 2,330,204 A 9/1943 Campbell
3,217,097 A 11/1965 Pauli et al.
(Continued)

FOREIGN PATENT DOCUMENTS

WO WO 2014187641 A1 * 11/2014 ............... B66D 1/08

OTHER PUBLICATIONS

Erdinc Altug et at; Control of a Quadrotor Helicopter Using Dual Camera Visual Feedback; The International Journal of Robotics Research vol. 24, No. 5, May 2005, pp. 329-341; © 2005 Sage Publications.

*Primary Examiner* — Tien Dinh
*Assistant Examiner* — Michael Wang
(74) *Attorney, Agent, or Firm* — Reches Patents

(57) ABSTRACT

A system that includes a ground unit that includes: a takeoff and landing platform; a landing and takeoff assisting module; and a housing. The takeoff and landing platform is arranged to hold and support an aerial unit during a first part of a landing process of the aerial unit and a first part of takeoff process of the aerial unit. The aerial unit is coupled to the ground unit via a connecting element. The effective length of the connecting element increases during the takeoff process and decreases during the landing process. The landing and takeoff assisting module is coupled to the takeoff and landing platform and is arranged to (a) lower the takeoff and landing platform into the housing during a second part of the landing process and (b) elevate the takeoff and landing platform during a second part of the takeoff process.

22 Claims, 31 Drawing Sheets

(51) Int. Cl.
  *B64F 1/12* (2006.01)
  *B64C 39/02* (2006.01)
  *B64C 29/04* (2006.01)
  *B64C 27/04* (2006.01)
  *B64F 1/00* (2006.01)

(52) U.S. Cl.
  CPC ..... *B64C 2201/127* (2013.01); *B64C 2201/148* (2013.01); *B64F 1/007* (2013.01); *B64F 1/125* (2013.01)

(56) References Cited

U.S. PATENT DOCUMENTS

| | | | |
|---|---|---|---|
| 3,923,274 A * | 12/1975 | Stocklin et al. | 244/115 |
| 3,948,467 A * | 4/1976 | Krusius | 244/116 |
| 4,058,277 A | 11/1977 | Kozakiewicz et al. | |
| 4,500,057 A * | 2/1985 | Duwelz | 244/172.4 |
| 4,544,116 A * | 10/1985 | Shwayder | 244/108 |
| 4,795,111 A | 1/1989 | Moller | |
| 5,026,003 A | 6/1991 | Smith | |
| 5,092,540 A * | 3/1992 | Burgess et al. | 244/110 F |
| 5,152,478 A | 10/1992 | Cycon et al. | |
| 5,368,256 A | 11/1994 | Kalisz et al. | |
| 5,588,387 A * | 12/1996 | Tellington | 114/261 |
| 5,687,930 A * | 11/1997 | Wagner | B64F 1/125 244/116 |
| 6,955,324 B2 | 10/2005 | Tanielian | |
| 7,040,247 B2 * | 5/2006 | Chouery | 114/261 |
| 7,152,547 B1 * | 12/2006 | Hovland | 114/261 |
| 7,198,226 B2 * | 4/2007 | Muylaert et al. | 244/116 |
| 7,497,759 B1 | 3/2009 | Davis | |
| 7,510,142 B2 | 3/2009 | Johnson | |
| 7,631,834 B1 * | 12/2009 | Johnson et al. | 244/17.17 |
| 8,051,791 B2 * | 11/2011 | Hovland et al. | 114/261 |
| 8,297,552 B2 * | 10/2012 | Ying | 244/114 R |
| 8,322,648 B2 | 12/2012 | Kroetsch et al. | |
| 8,350,403 B2 * | 1/2013 | Carroll | 290/55 |
| 8,424,802 B2 * | 4/2013 | Tripier-Larivaud | 244/114 R |
| 8,453,966 B2 * | 6/2013 | McGeer | B64C 25/68 244/110 C |
| 8,573,536 B2 * | 11/2013 | McGeer | B64C 39/024 244/110 C |
| 2005/0082421 A1 | 4/2005 | Perlo et al. | |
| 2006/0226281 A1 | 10/2006 | Walton | |
| 2006/0249623 A1 * | 11/2006 | Steele | 244/116 |
| 2009/0236470 A1 * | 9/2009 | Goossen et al. | 244/115 |
| 2009/0283629 A1 | 11/2009 | Kroetsch et al. | |
| 2010/0243794 A1 | 9/2010 | Jermyn | |
| 2012/0241553 A1 | 9/2012 | Wilke | |
| 2013/0099054 A1 * | 4/2013 | Besenzoni | 244/110 E |
| 2013/0134260 A1 * | 5/2013 | Besenzoni | B63B 3/48 244/110 E |

* cited by examiner

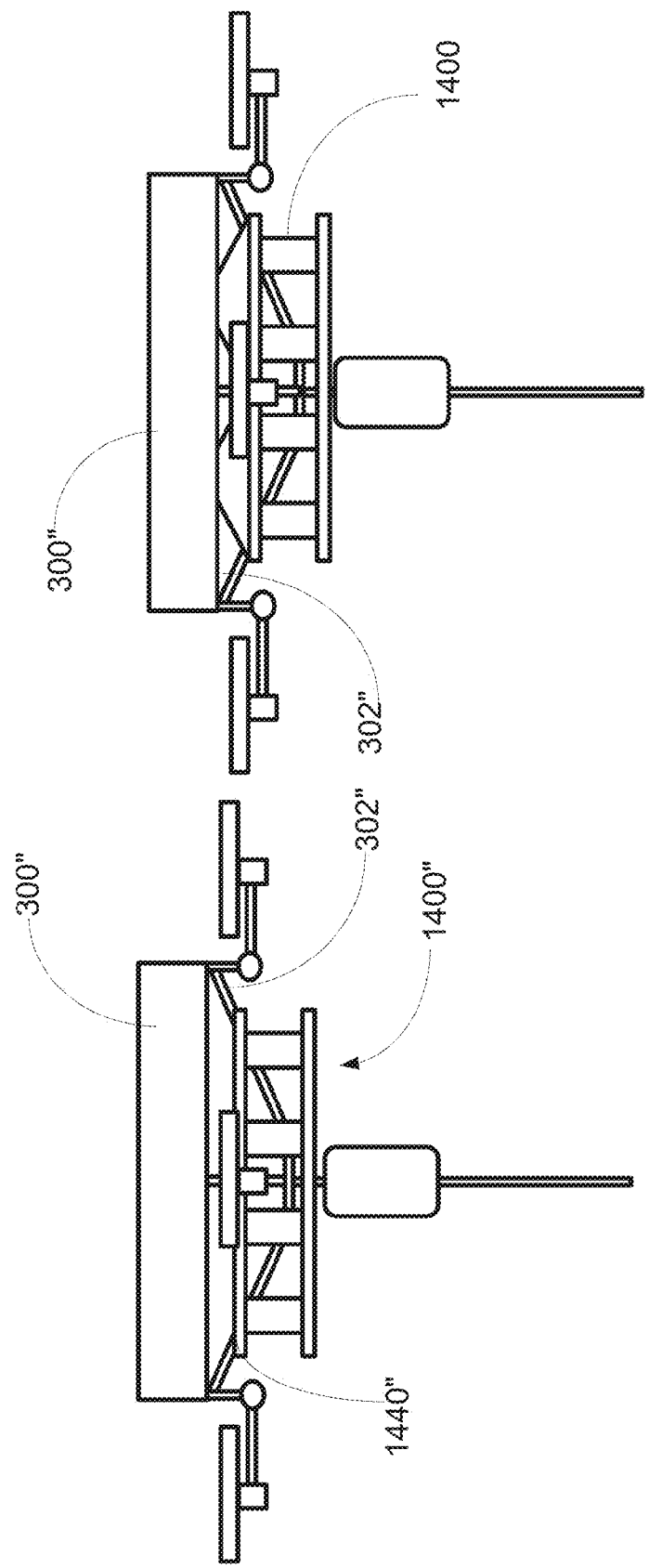

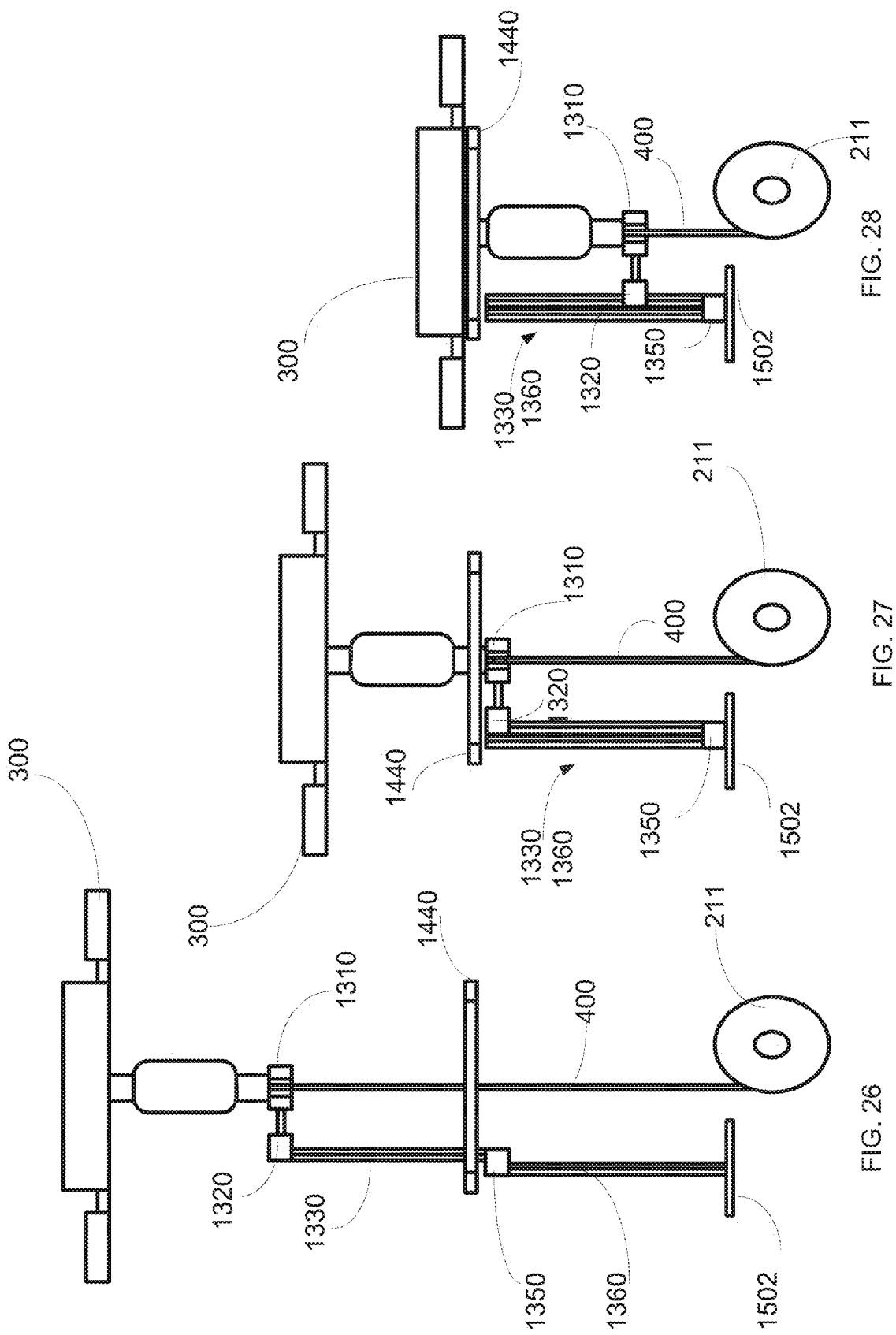

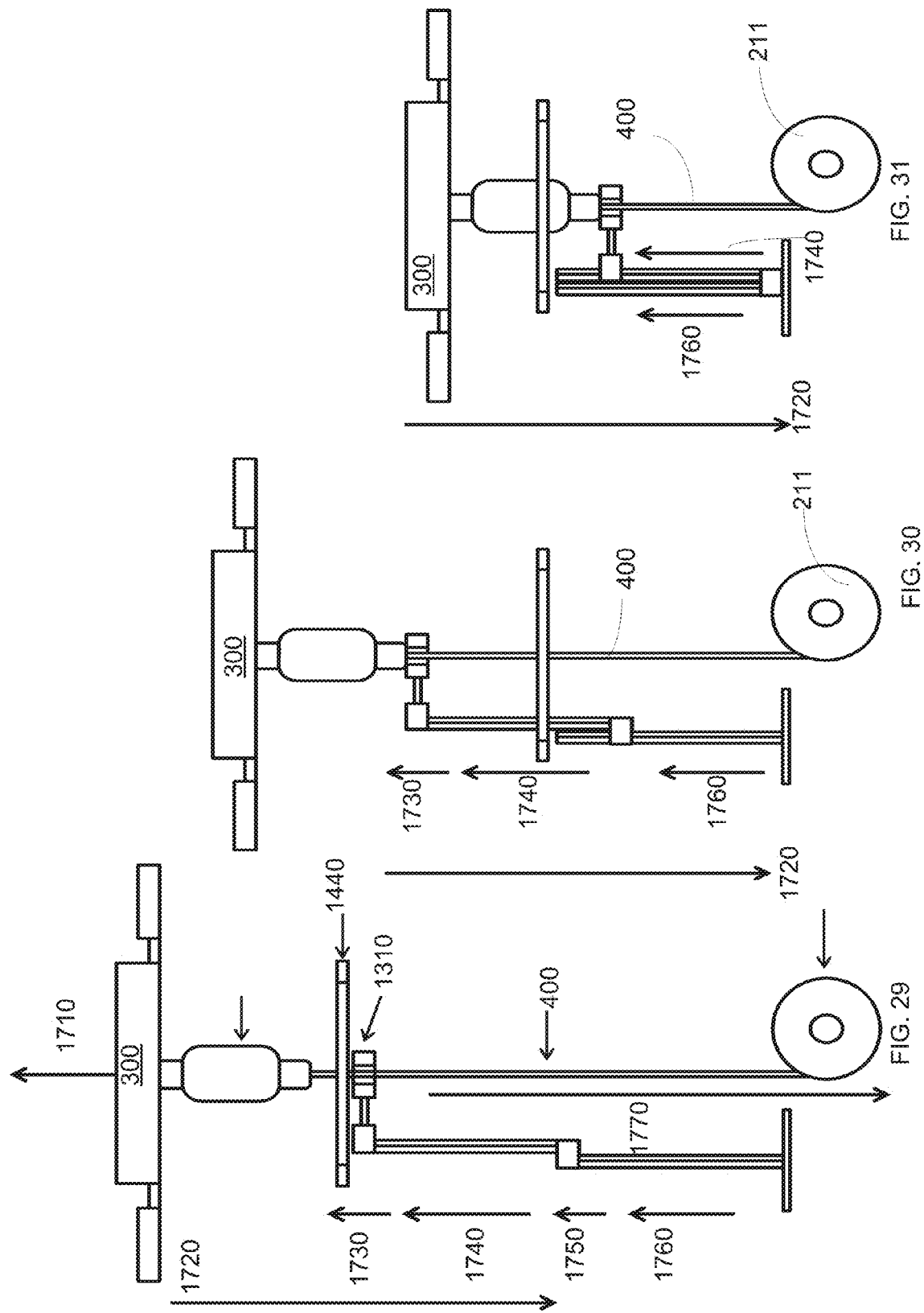

AERIAL UNIT AND METHOD FOR ELEVATING PAYLOADS

RELATED APPLICATIONS

This application is a continuation in part of U.S. patent application Ser. No. 13/814,244 filing date Feb. 5, 2013 which is a national phase application of PCT patent application PCT/IB2011/055021 International filing date Nov. 10, 2011 that claims priority from U.S. provisional patent 61/412,816 filing date Nov. 12, 2010, both incorporated herein by reference in their entirety.

FIELD OF THE INVENTION

The invention relates to systems, aerial units and method for elevating payloads by the aerial unit.

BACKGROUND OF THE INVENTION

Prior art of height observation and signaling equipment (such as observation cameras) are connected to a base unit by using a mast made of rigid metal construction or other stiff materials that supports the equipment.

The mast implements large moments on the base due to its significant height. For example, every single Kg force of wind pressure at the top of a 30 meter height mast will implement a moment of about 30 Kg at one meter on the platform, and a pressure of about 150 Kg on a typical 20 cm diameter base construction. Thus, a heavy duty vehicle is required to support the equipment with its supporting construction.

In addition, the process of lifting the equipment to the destined altitude is time consuming and requires a team work. Tactic balloons and masts suffer from long spreading time, long folding time, large size (about 1 cubic meter of Helium for 300 gram of payload and balloon), bad stability and require highly trained operators.

There is a need for a simpler system and method for lifting equipment for height observation or signaling such as an observation camera.

SUMMARY

According to an embodiment of the invention a system is provided and may include a ground unit. The ground unit may include a takeoff and landing platform; a landing and takeoff assisting module; and a housing. The takeoff and landing platform is arranged to hold and support an aerial unit during a first part of a landing process of the aerial unit and a first part of takeoff process of the aerial unit. The aerial unit is coupled to the ground unit via a connecting element. The effective length of the connecting element increases during the takeoff process and decreases during the landing process. The landing and takeoff assisting module is coupled to the takeoff and landing platform and is arranged to (a) lower the takeoff and landing platform into the housing during a second part of the landing process and (b) elevate the takeoff and landing platform during a second part of the takeoff process.

The system may include a connecting element manipulator, for altering the effective length of a connecting element; wherein the effective length of the connecting element defines a distance between the ground unit and the aerial unit.

The system may include a fold and unfold unit.

The aerial unit may include a main propulsion module and multiple peripheral propulsion modules that extend outside the main propulsion module when the aerial unit hovers above the ground unit; wherein the fold and unfold unit may be arranged to assist in reduction of a footprint of the aerial unit during a third part of the landing process by altering a spatial relationship between the main propulsion module and the peripheral propulsion modules.

Each peripheral propulsion modules may be coupled to the a frame of the aerial unit via a pivoting joint that is selectively locked by a locking element; wherein the fold and unfold unit may be arranged to unlock the locking element during a fourth part of the landing process and to rotate the pivoting joint thereby causing the peripheral propulsion module to rotate and thereby reduce the footprint of the aerial unit.

The fold and unfold unit may include a locking element lifting module that may be arranged to lift the locking element during the fourth part of the landing process; a rotating module for rotating the pivoting joint and thereby causing the peripheral propulsion module to rotate.

The fold and unfold unit may include a main holder that may be arranged to hold a part of a main frame of the main propulsion module during a fifth part of the landing process and a secondary holder for holding a part of a peripheral frame of the peripheral propulsion module to rotate during a sixth part of the landing process.

The takeoff and landing platform may include a base element that is positioned below a centering and positioning frame and coupling elements that coupled the centering and positioning frame and the base element and couple while allowing relative movement between the centering and positioning frame and the base element.

The coupling elements may include springs.

The coupling elements may include restraining elements for limiting a relative movement between the centering and positioning frame and the base element.

The coupling elements facilitate changes in a relative orientation between the centering and positioning frame and the base element.

The aerial unit may include bottom frame elements; wherein the takeoff and landing platform may include a centering and positioning frame that is shaped and positioned to force the bottom frame elements to be positioned at alignment positioned at a seventh part of the landing process.

The bottom frame element are positioned in an imaginary flat plane and wherein the centering and positioning frame has upper edges that define maximum points and minimum points; and wherein the minimum points form the alignment position.

The centering and positioning frame may include N symmetrical triangles that define N minimum points for receiving N bottom frame elements of the aerial unit.

The landing and takeoff assisting module may include a restraining element positioned at a center of the landing and takeoff assisting module; wherein the restraining element has an aperture through which the connecting element passes.

The landing and takeoff assisting module may include a first selective movement force controlled element that is coupled to a first elevation element and to a second elevation element; wherein the first selective movement force controlled element may be arranged to prevent relative elevation movement between the first and second elevation elements when a force applied on the first selective movement force controlled element is below a first threshold and to allow relative elevation movement between the first and second elevation elements when the force applied on the first selective movement force controlled element exceeds the first threshold.

The first elevation element is coupled to the restraining element.

The first elevation element is coupled to the restraining element via a second selective movement force controlled element.

The system may include an elevation module that may be arranged to lower and lift the takeoff and landing platform and landing and takeoff assisting module within the housing.

The elevation module contacts the folding and unfolding module and wherein the system may include a force distribution module that may be arranged to reduce an uneven distribution of forces applied on the folding and unfolding module by the elevation module.

The elevation module contacts the folding and unfolding module at a certain location and wherein the force distribution module contacts the folding and unfolding at a location that is substantially opposite to the certain location.

The system may include the aerial unit.

The aerial unit may include a main propulsion module and multiple peripheral propulsion modules that extend outside the main propulsion module when the aerial unit hovers above the ground unit and are pivotally coupled to a main frame of the aerial unit.

Each peripheral propulsion modules may be coupled to the main frame of the aerial unit via a pivoting joint that is selectively locked by a locking element; wherein a rotation of the pivoting joint causes the peripheral propulsion module to rotate and thereby reduce the footprint of the aerial unit.

BRIEF DESCRIPTION OF THE DRAWINGS

Further features and advantages of the invention will be apparent from the description below. The invention is herein described, by way of example only, with reference to the accompanying drawings, wherein:

FIG. 22-25 illustrate the aerial unit and the takeoff and landing platform according to various embodiments of the invention;

FIG. 26-31 illustrate the landing and takeoff assistance module according to various embodiments of the invention;

FIG. 37 illustrates a method according to an embodiment of the invention.

DETAILED DESCRIPTION OF THE DRAWINGS

A system is provided. The system may be used for height spreading of observation, signaling equipment, antennas, transmission relay station, anti-terrorist surveillance, and the like. The system may be a light, compact and portable and may include a ground unit and an aerial unit. The aerial unit orientation and location (displacement) may be controlled within four degrees of freedom while maintaining a built-in stability thereof. The system may be automatically and easily deployed and folded.

Various applications can use the system, for example: observation, height photographing, a reception/transmission relay, spot marking (by a projector or laser), antennas etc.

Various embodiments of systems 100-106 are illustrated in FIGS. 1-7. Systems 100, 102, 103, 104 and 105 of FIGS. 1,3,4,5 and 6 are illustrated as including a single video camera 232.

Figure 2:
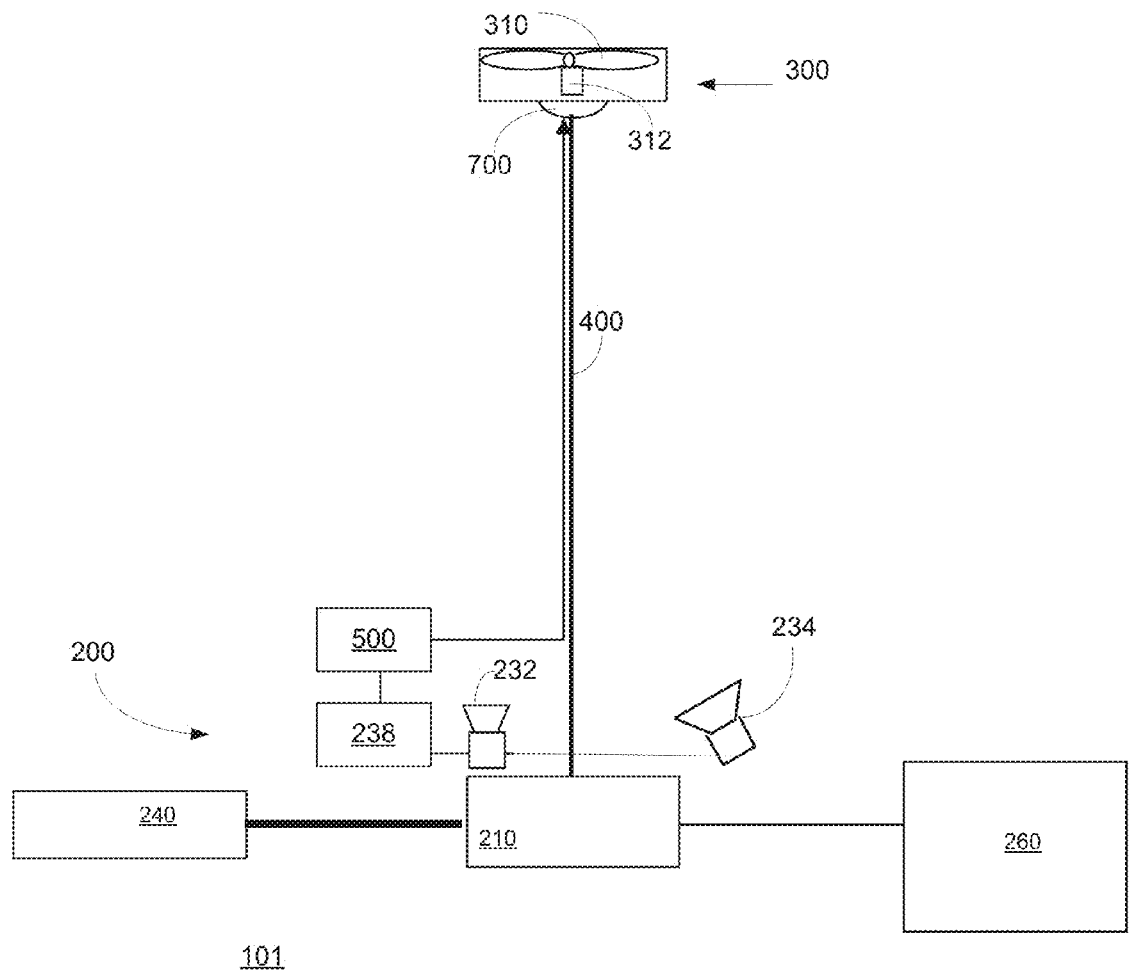
FIG. 2 is a general view of a system according to an embodiment of the invention.
Figure 7:
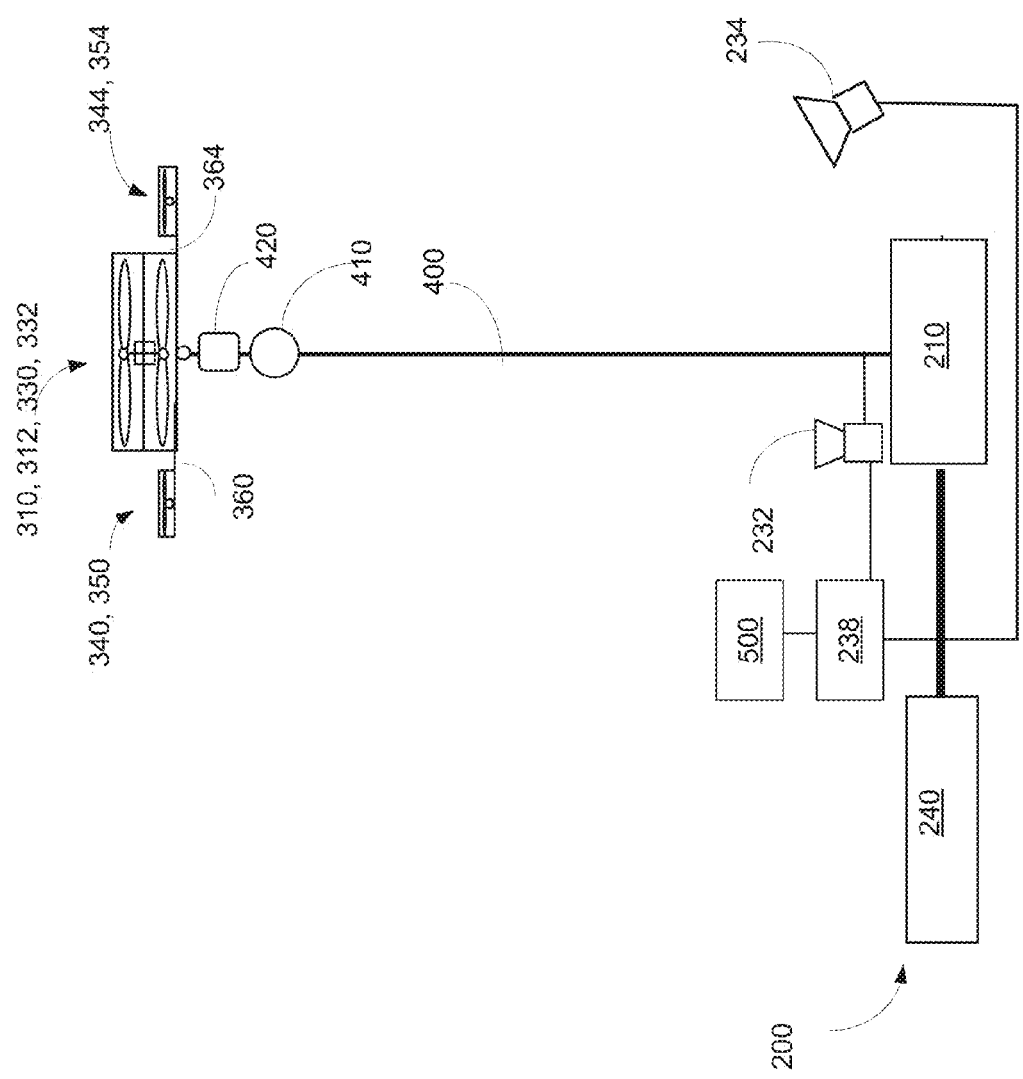
FIG. 7 is a general view of a system according to an embodiment of the invention.
Figure 8:
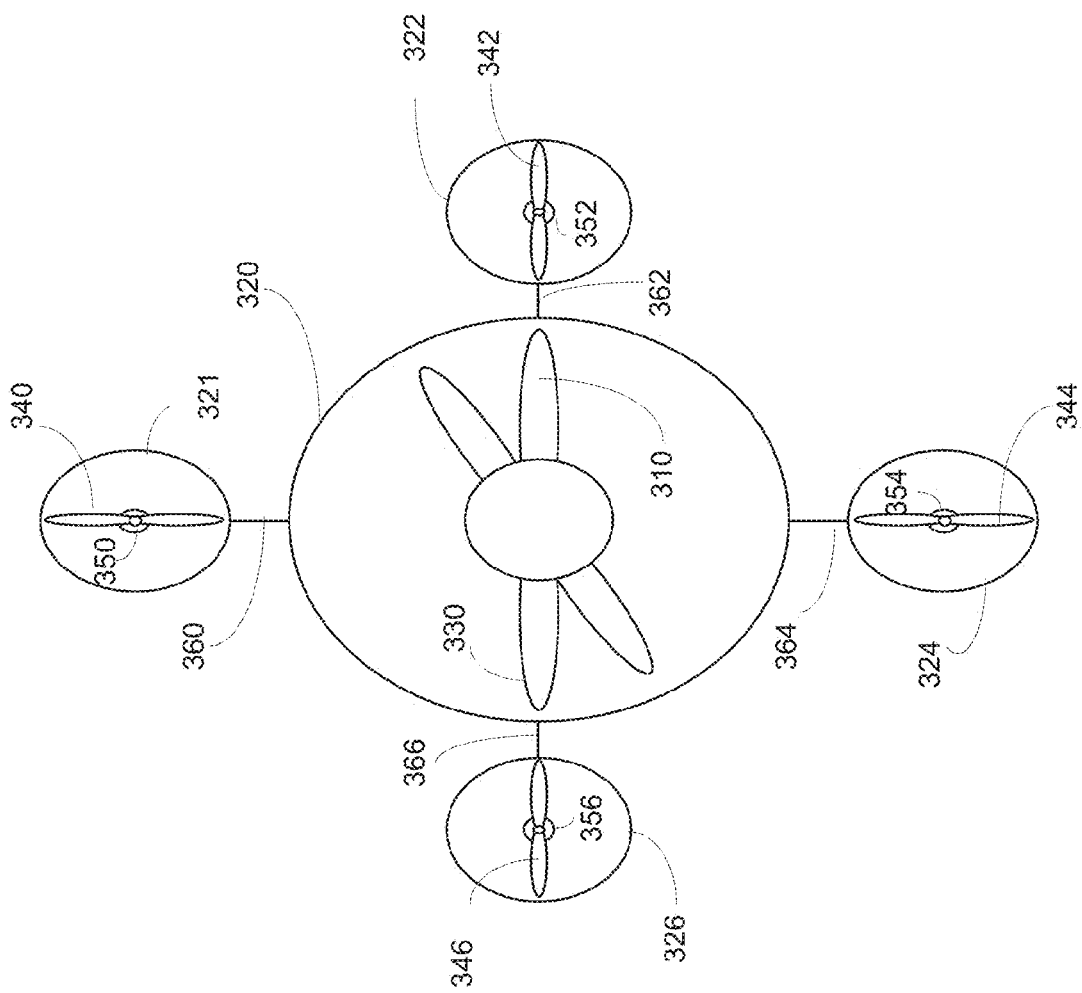
FIG. 8 is a general view of an aerial unit of a system according to an embodiment of the invention.

Systems 101 and 106 of FIGS. 2 and 7 have two video cameras 232 and 234. It is noted that each system can have more than two video cameras.

Systems 100, 101, 102 and 104 of FIGS. 1, 2, 3 and 5 are illustrated as having an aerial unit with a single propeller 310 (and also include a steering element that may be a second propeller and is not shown).

Figure 4:
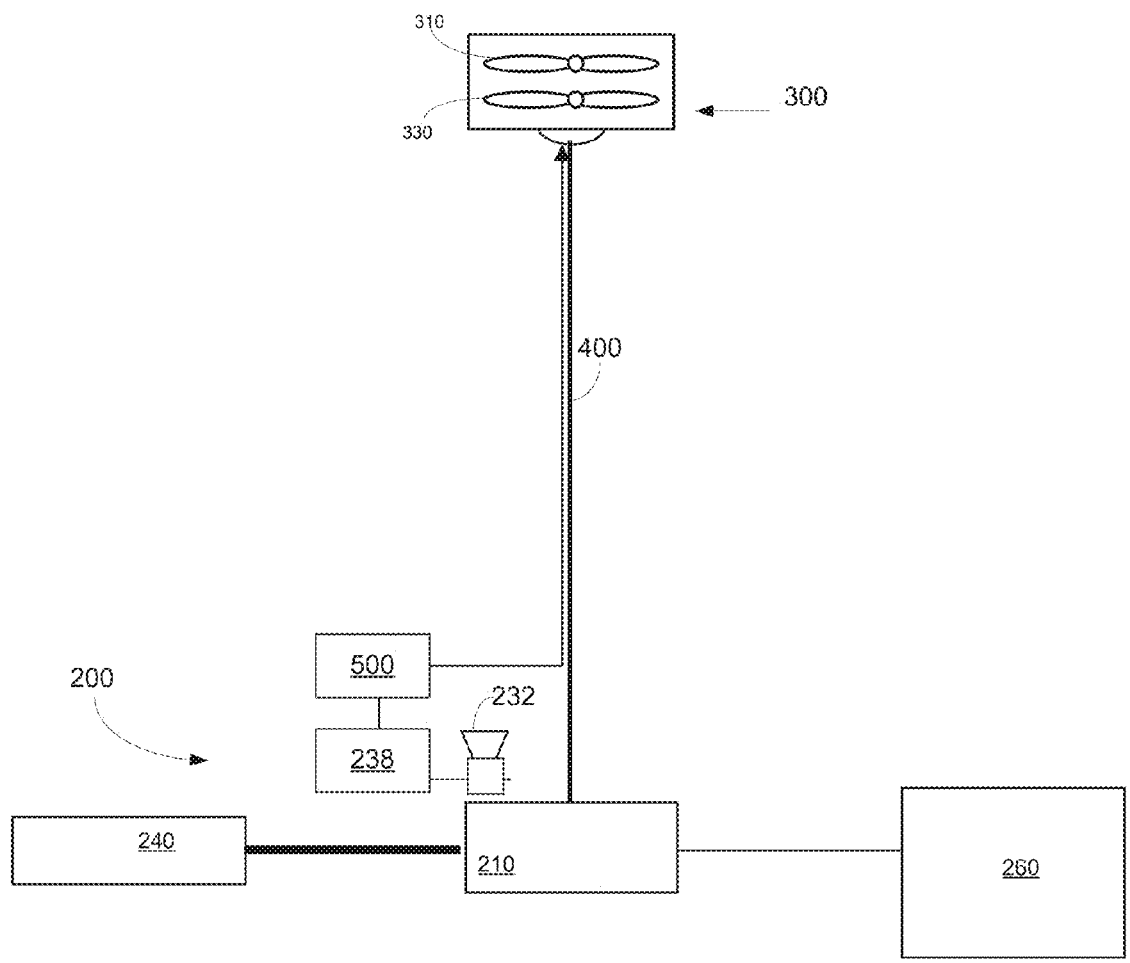
FIG. 4 is a general view of a system according to an embodiment of the invention.

System 103 of FIG. 4 has a pair of propellers 310 and 330 that rotate about concentric axes.

Figure 6:
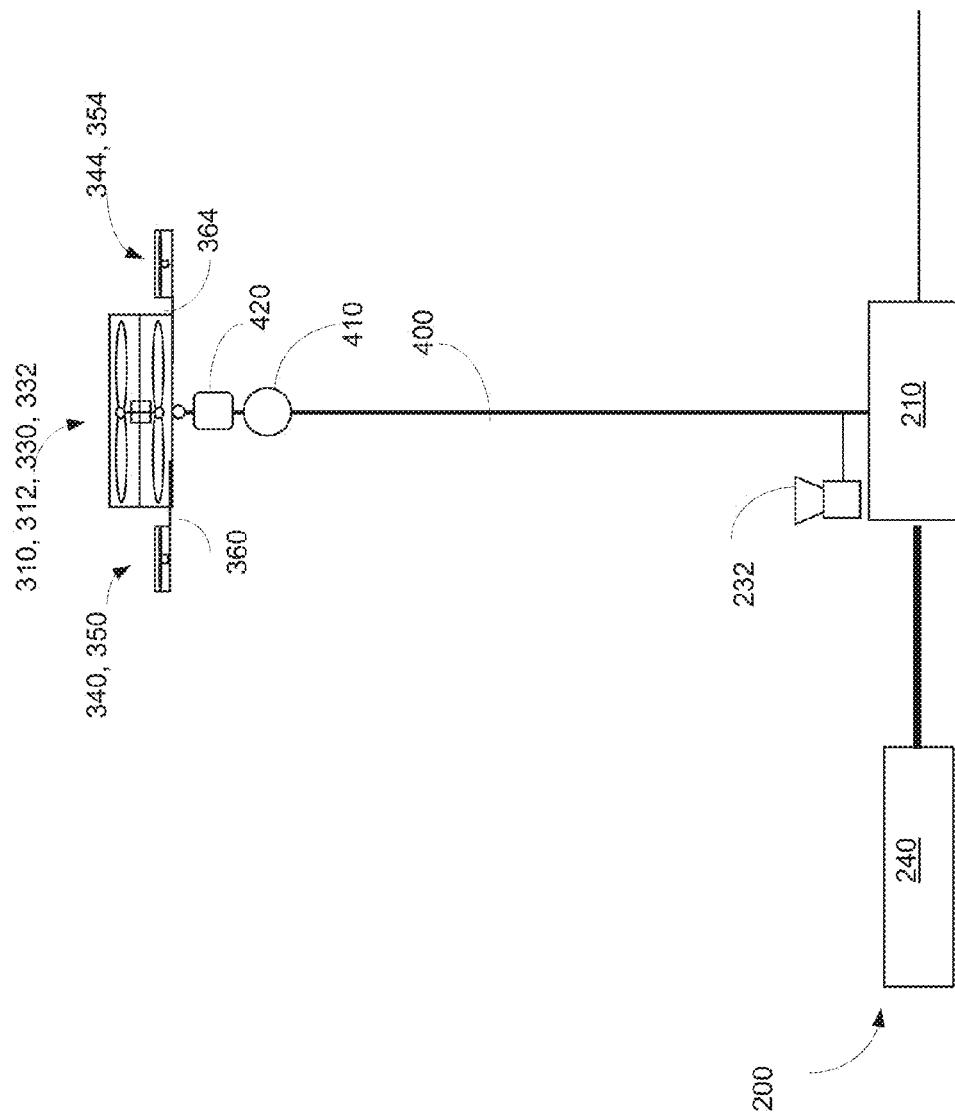
FIG. 6 is a general view of a system according to an embodiment of the invention.

Systems 105 and 106 of FIGS. 6 and 7 include a pair of "main" propellers 310 and 330 as well as additional propellers 340, 342, 344 and 346.

Figure 3:
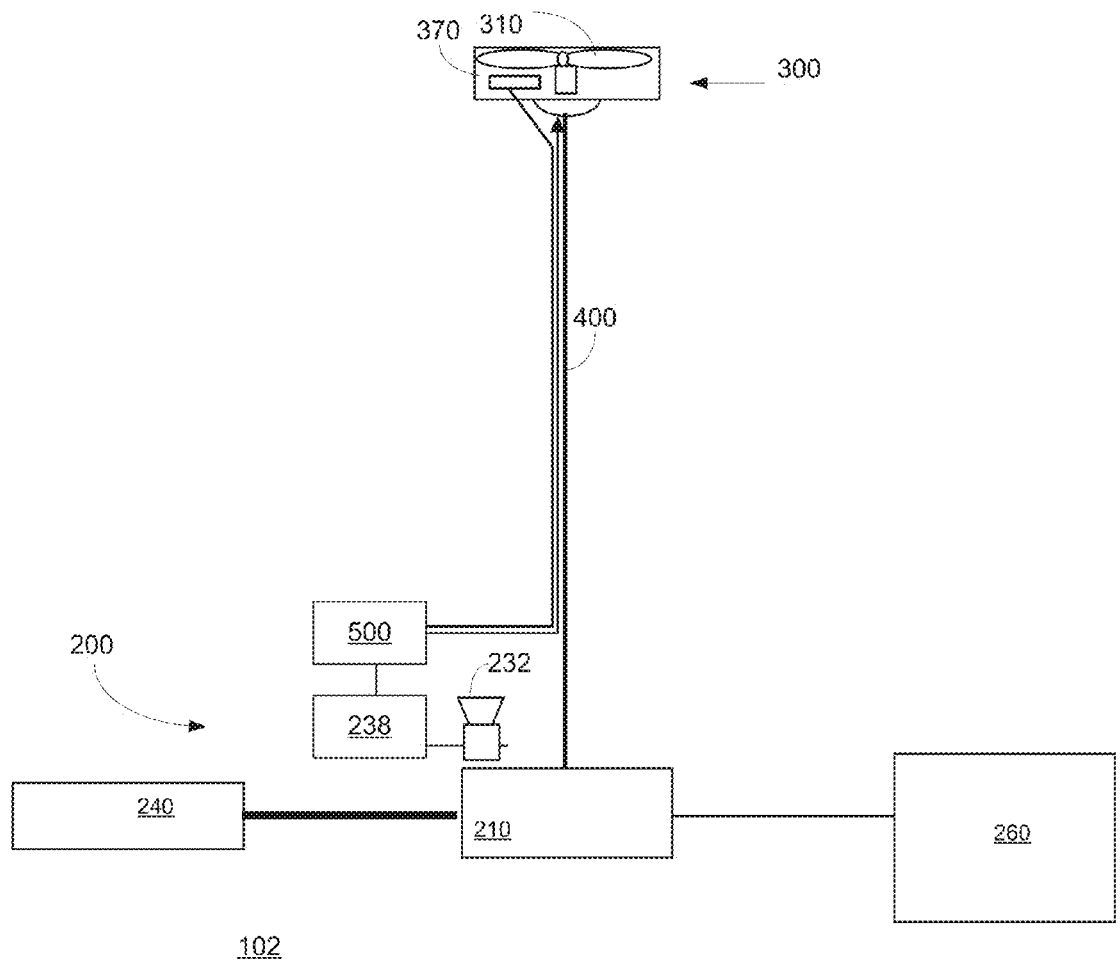
FIG. 3 is a general view of a system according to an embodiment of the invention.

System 102 of FIG. 3 is illustrates as having an aerial unit that includes an orientation sensor 370.

Figure 11:
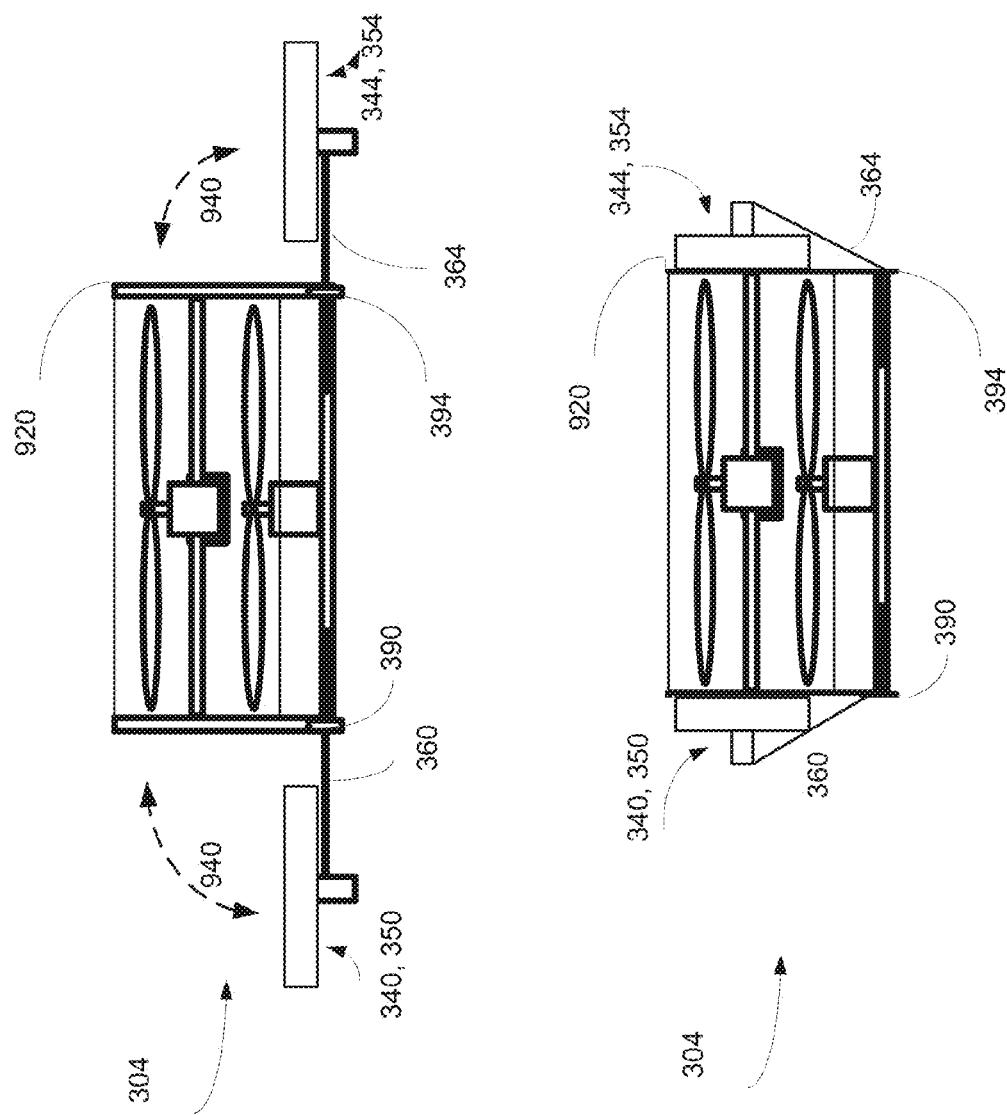
FIG. 11 is a general view of an aerial unit of a system according to an embodiment of the invention.

Aerial units 301, 302 and 304 of FIGS. 8-11 are illustrates as including a pair of propellers as well as four additional propellers. These figures illustrate different folding arrangements of the four additional propellers. FIGS. 10A-10D illustrate a rotation within an imaginary horizontal plane while FIG. 11 illustrates a rotation within a vertical plane. FIG. 10A is a top view of aerial unit 302 at an open configuration. FIG. 10B is a top view of aerial unit 302 at a closed configuration. FIG. 10C is a side view of aerial unit 302 at a closed configuration where the additional propellers (for example 322 and 326) are located below the first and second propellers 310 and 330. FIG. 10D is a side view of aerial unit 302 at a closed configuration where the additional propellers (for example 322 and 326) are located between the first and second propellers 310 and 330.

Any combination of components of each of the systems can be provided. The same applies to the aerial unit. For example, any one of systems 101-107 can be equipped with any of the aerial units 300, 302 and 304. Yet for another example, each system can include one or more video cameras, one or more orientation sensors and the like.

A system may be provided and may include a ground unit 200, an aerial unit 300, 302 and 304 and a connecting element 400 arranged to connect the ground unit 200 to the aerial unit 300, 302 and 304.

The ground unit 200 may include a connecting element manipulator 201, a base 202 and a ground unit controller 203 (collectively denoted 210).

The connecting element manipulator 201 is for altering an effective length of the connecting element 400. The effective length of the connecting element 400 defines a distance between the ground unit 200 and the aerial unit 300, 302 and 304.

The connecting element 400 can be a flexible cable that is maintained in a tensed status while the aerial unit 300, 302 and 304 is in the air.

The aerial unit 300, 302 and 304 can be arranged to maneuver in relation to the flexible cable, when the flexible cable is maintained in the tensed status.

The Flexible cable may include an electrical cable and a communication cable. These cables may be wrapped by or otherwise surrounded by flexible cable that provides a mechanical connectivity between the ground unit and the aerial unit.

The flexible cable is expected to physically tie and secure the aerial unit and electrically connect the ground unit and the aerial unit for power supply and communication. The aerial unit and the flexible cable do not require a special vehicle for support, as any van or relatively light vehicle can be adequate. Lighter versions of the system can even be carried by a person and even installed inside a backpack.

The flexible cable (once fully released) may be of 30 m length in order to get a good observation but other lengths may be used too. The average lifting and landing time of the aerial unit is around 10 seconds. The aerial unit may be configured to hold a payload of 1 to 5 kilos (although heavier or lighter payloads may be lifted by the aerial unit), may have a low heat emission and may barely generate noise. It is noted that flexible cables of other lengths may be used.

The base 202 is for receiving aerial unit and even for storing the aerial unit when the aerial unit is at its lowest position (ground position).

The ground unit controller 203 is for controlling the connecting element manipulator 201.

The ground unit 200 also include a positioning unit 230 that is arranged to image the aerial unit and to generate metadata about a location of the aerial unit. The position unit is illustrates in FIG. 1 as including video camera 232 and an image processor 238. It may include multiple video cameras (as illustrated in FIGS. 2 and 7). The metadata can refer to the location of the aerial unit, to the orientation of the aerial unit of both. It has been found that the image processing can be simplified by having the single video camera detect the location of the aerial unit while an orientation sensor (370 of FIG. 3) can detect the orientation of the aerial unit.

According to various embodiment of the invention various aerial units 300, 302 and 304 are provided. These aerial units may differ from each other by the number of propellers (second propeller 330, additional propellers 340, 342, 344 and 346 as their propeller motors), the existence of an orientation sensor 370, the manner in which payload is connected (to the aerial unit or to the connecting element 400), manner in which the additional propellers (if exist) converge when the aerial unit is in a close position, the number, shape and size of the additional propellers and the like, the type of electronic circuitry that is included in the aerial unit—from a controller to having only control wires and power lines the convey power and instructions to the various propeller motors.

Any of the aerial units 300, 302 and 304 may include (a) a first propeller 310, (b) a frame 320, (c) a first propeller motor 312 that is configured to rotate the first propeller 310 about a first axis, wherein the first propeller motor 312 is connected to the frame 320, and (d) at least one steering element. The at least one steering element can be a second propeller 330, one or more additional propellers 340, 342, 344 and 346 or any other steering element such as movable shelves.

At least one of the ground unit 200 and the aerial unit 300, 302 and 304 may include a controller (such as controller 500) that is arranged to control, at least in response to the metadata, at least one of the first propeller motor 312 and the at least one steering element to affect at least one of the location of the aerial unit 300, 302 and 304 and the orientation of the aerial unit 300, 302 and 304.

For simplicity of explanation controller 500 is illustrated as being a part of the ground unit 200 but this is not necessarily so.

As indicated above, the positioning unit may include a single video camera (232), multiple video cameras (232, 234) and at least two optical axes of at least two video cameras are oriented in relation to each other.

Figure 1:
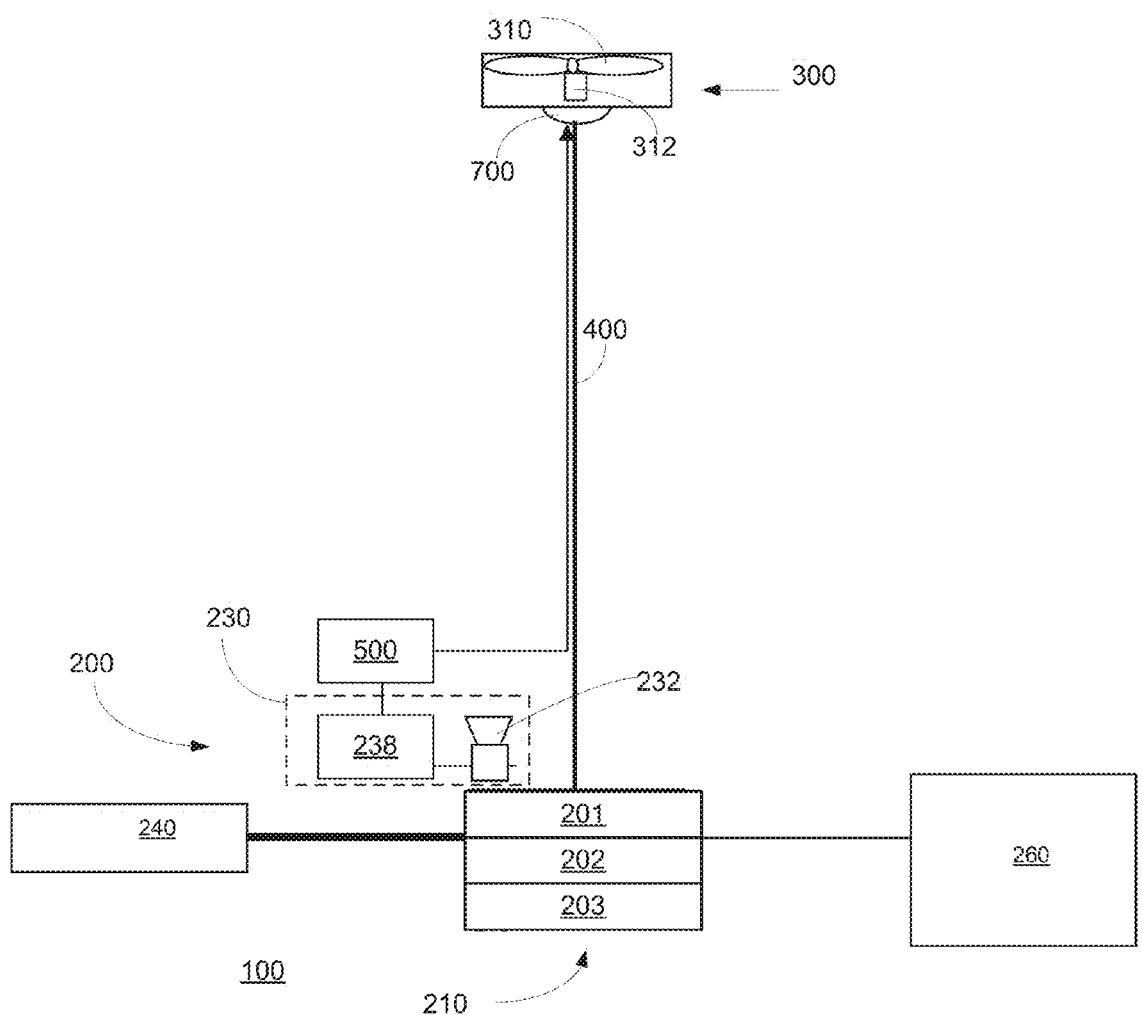
FIG. 1 is a general view of a system according to an embodiment of the invention.

The video camera 232 can be proximate to point in which the connecting element 400 is connected to the ground unit—as shown, for example, in FIG. 1.

The video camera can be remotely positioned from the connecting element manipulator 201.

The image processor 238 may be arranged to determine a location of the aerial unit in relation to a desired location, and generate location metadata indicative of position corrections that should be made to position the aerial unit at the desired location. The location metadata can include positioning commands, the desired correction to be applied in order to return the aerial unit to a desired rotation and the like.

FIG. 7 illustrates a connector 410 (such as a joint) that couples the flexible cable 400 to the aerial unit 300, 302 and 304 while allowing the aerial unit 300, 302 and 304 to move in relation to the flexible cable 400.

FIG. 7 further illustrates an interface electronic unit 420 that is positioned below the connector 410 and is arranged to send power and commands to the first motor. The interface electronic unit 420 can send commands to the various propeller motors in a format that is compliant to the formal acceptable by these various propeller motors. Placing the interface electronic unit 420 outside the aerial unit and without being supported by the aerial unit reduced the weigh of the aerial unit and makes it easier to steer and manipulate.

FIGS. 4 and 7-11 illustrates a second propeller 330 that is arranged to rotate about a second axis; wherein the first and second axes are concentric. Yaw steering of the aerial unit can be facilitated by controlling the thrust of each of the first and second propellers 310 and 330, as illustrates by arrow 930 of FIG. 9.

The frame 320 at least partially surrounds the first propeller 310.

According to an embodiment of the invention the system includes additional propellers 340, 342, 344 and 346, as well as additional propeller motors 350, 352, 354 and 356 that are arranged to rotate the additional propellers.

Each additional propeller is positioned outside the frame 320. The controller 500 mat be further arranged to control the additional propeller motors.

The additional propellers may be are arranged in a symmetrical manner around the first propeller 310.

The additional propellers 340, 342, 344 and 348 may be smaller than the first propeller 310.

The various propeller motors can be independently controlled by the controller 500. The controller 500 can independently control at least two of the propeller motors. Thus, the thrust and the direction of such motors can differ from each other.

Figure 9:
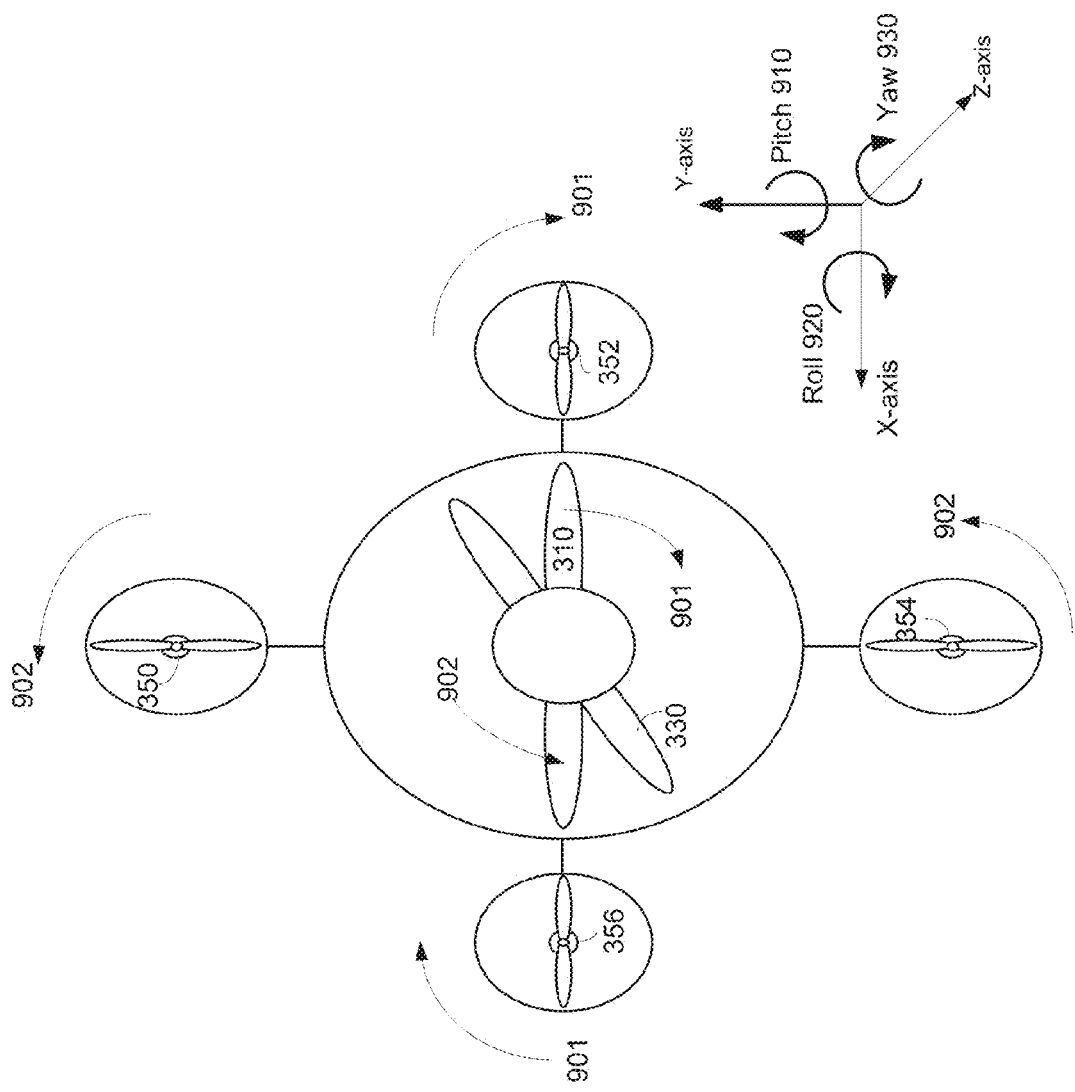
FIG. 9 is a general view of an aerial unit of a system according to an embodiment of the invention.
Figure 10B:
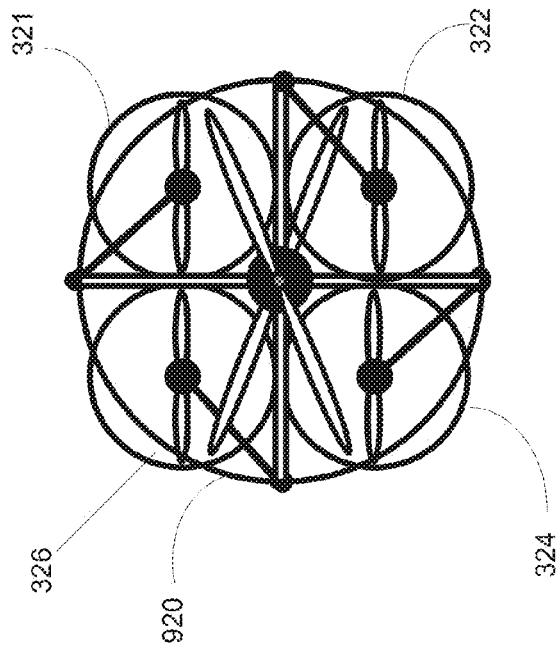
FIGS. 10A-10D are general views of aerial units of systems according to embodiments of the invention.
Figure 10D:
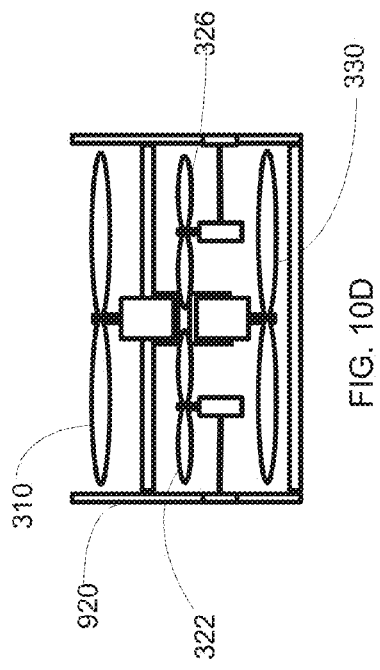
Figure 10A:
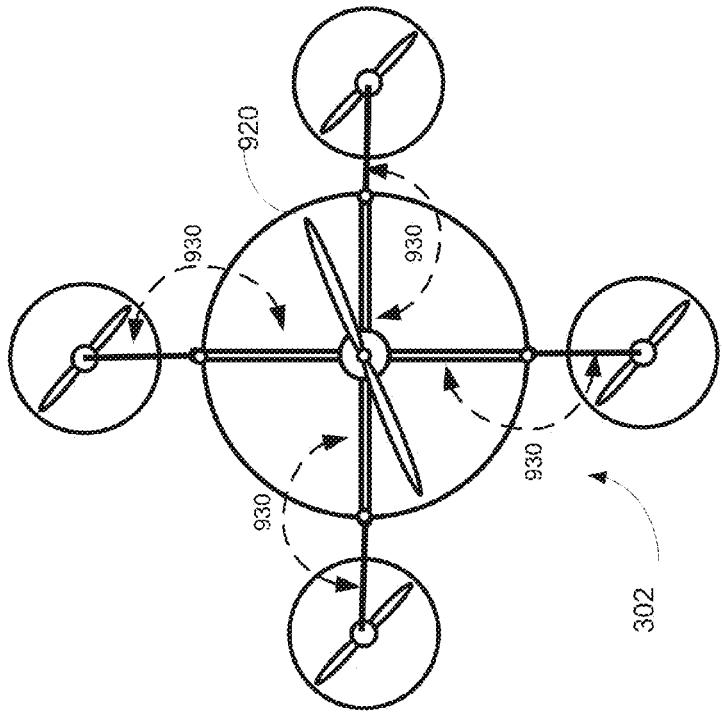
Figure 10C:
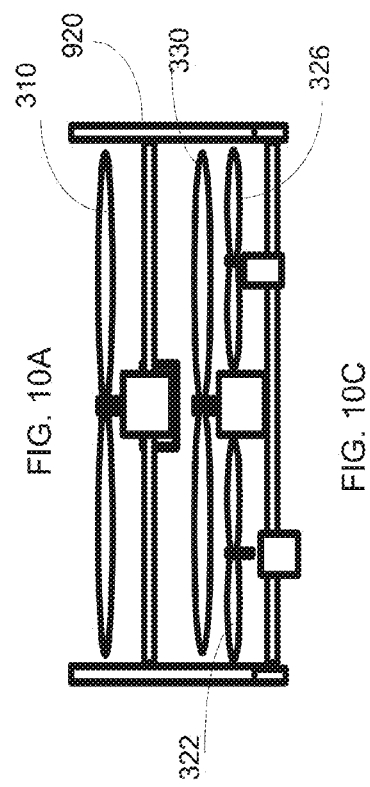

The controller 500 can be arranged to control one additional propeller motor to rotate in a clockwise manner and control another additional propeller motor to rotate in a counterclockwise manner. FIG. 9 illustrates three propellers that rotate clockwise (920) and three other propeller that rotate counterclockwise (901).

The controller 500 may alter at least one of a location and an orientation of the aerial unit 302, 304 by controlling a thrust of at least two propellers of a group of propellers that includes the additional propeller and the first propeller.

The controller 500 may perform yaw steering by controlling the first propeller 310 and at least one steering element (such as second propeller 330) that differs from the additional propellers.

The controller 500 may perform pitch (910) and roll (920) steering by controlling at least two additional propellers.

The controller 500 may be arranged to control (by sending control signals) a change of at least one of a location and orientation of the aerial unit by altering at least one thrust of at least one propeller of the group while maintaining directions of rotation of the propellers of the group unchanged. An example is provided in FIG. 9—the direction of rotation remains unchanged. The following table illustrates a relationship between thrust differences and their meaning.

| Difference between thrust of first and second propellers 310 and 330 | Yaw steering (rotation about z-axis) |
| Difference between thrust of first and third additional propellers 340 and 344 | Roll steering (rotation about x-axis) |
| Difference between thrust of second and fourth additional propellers 342 and 346 | Pitch steering (rotation about y-axis) |

For example, referring to the example set forth in FIG. 9, allowing the first propeller 310 to develop more thrust than the second propeller 330 will cause the aerial unit to rotate clockwise. Allowing the first additional propeller 340 to develop more thrust than the third additional propeller 330 will cause the aerial unit to rotate within an imaginary Y-Z plane, wherein the rotation starts by lowering the third additional propeller 330 while elevating the first additional propeller.

Figure 5:
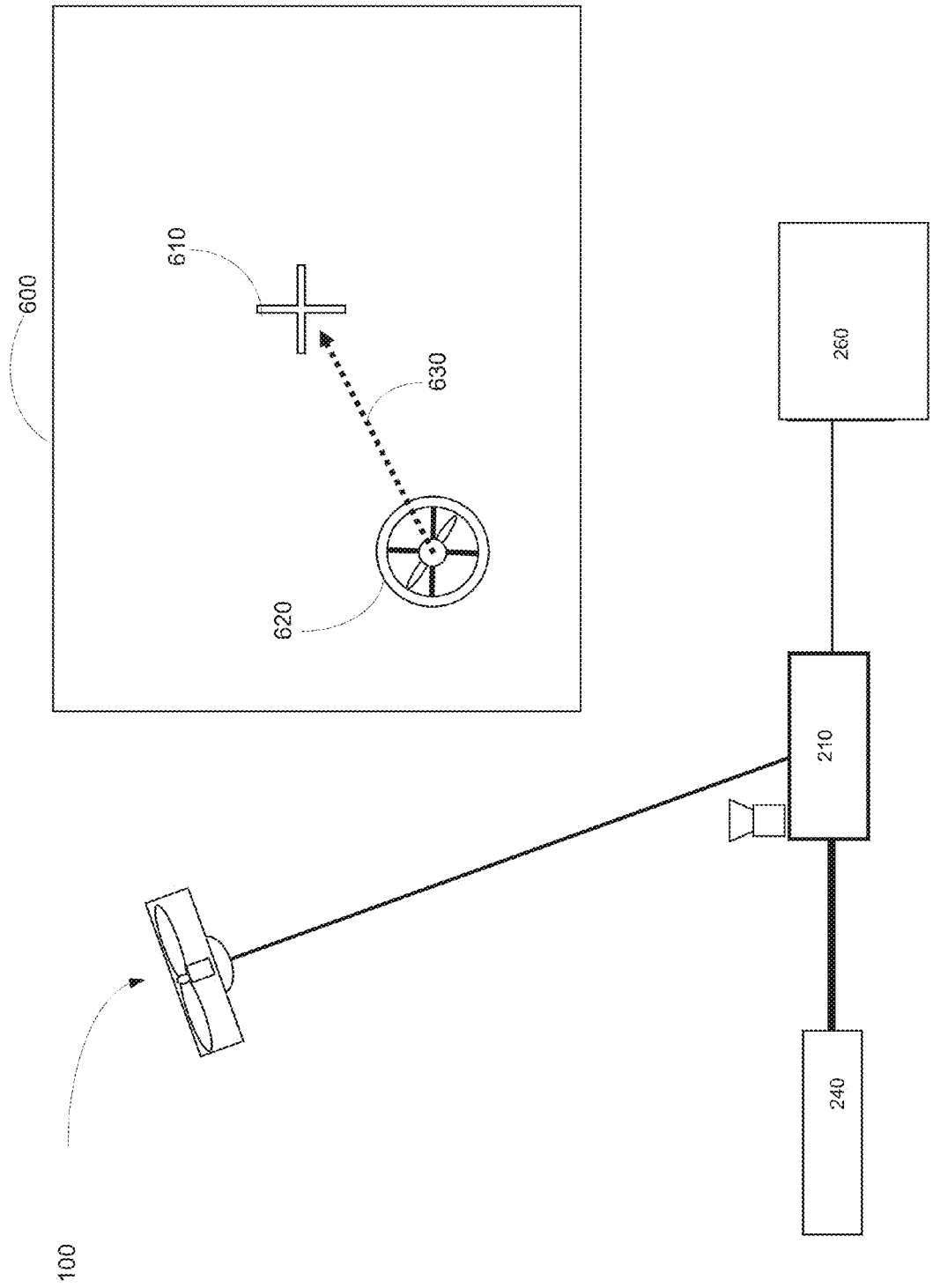
FIG. 5 is a general view of a system and of a field of view of a video camera according to an embodiment of the invention.

Various types of steering can be applied in order to set the aerial unit at a desired location, a desired orientation or both. If, for example, the wind causes the aerial unit to drift to a certain location the steering can be applied to counter that drift. FIG. 5 illustrates a field of view 600 of video camera 232, a current location 620 of the aerial unit, a desired location 610 of the aerial unit and a vector 630 that represents the desired location correction action.

Yet for another example, the steering can be applied in order to allow the aerial unit to fulfill a predefined flight pattern such as a scan pattern in which the aerial unit is directed along a scan patters thus allowing its payload to change its field of view according to a desired pattern.

The additional propeller motors 350, 352, 354 and 356 and the additional propellers 340, 342, 344 and 346 may be positioned outside the frame 320. The additional propeller motors 350, 352, 354 and 356 may be connected to additional frames 321, 322, 324 and 326. The additional frames 321, 322, 324 and 326 can be are coupled to the frame 320 by coupling elements 360, 362, 364 and 366 that allow movement between the frame 320 and the additional frames.

This movement is required to facilitate the aerial unit to move between an open configuration (FIG. 9, left side of FIG. 10 and upper portion of FIG. 11) to a close configuration (right side of FIG. 10 and lower portion of FIG. 11). The coupling elements can be rods, arms, or any structural element that facilitates such movement.

When the additional frames are in an open condition the additional frames 321, 322, 324 and 326 and the frame 320 do not overlap and when the additional frames 321, 322, 324 and 326 are in a close condition the additional frames 321, 322, 324 and 326 and the frame 320 overlap.

The additional frames can change their position from a horizontal position to a vertical position—when moving from an open position to a closed position—as illustrated in FIG. 11, and especially by dashed arrows 940.

Additionally or alternatively, the movement from a closed position to an open position can take place in a horizontal plane—as illustrated by dashed arrows 930 of FIG. 10.

The aerial unit can be in a closed position when proximate to the ground unit (at the beginning of the elevation process and at the end of the landing process). This can be done by activating motors that change the spatial relationship between the frame and the additional frames or by deactivating the additional propellers at the appropriate time.

Various figures such as FIGS. 1-5, illustrate the ground unit 200 as including a power source 240 and a user interface 260 that can allow a user to affect the control scheme—for example by determining the desired location. The user interface 260 may include a joystick (or other man machine interface) for receiving positioning commands and, additionally or alternatively, for displaying the location of the aerial unit in relation to the desired location.

The power provided to the aerial unit can also be utilized for powering the payload 700.

The ground unit 200 may be positioned on a vehicle such as a van and aerial unit that holds a payload (such as one or more types of equipment) and can lift itself to heights of about thirty meters within approximately ten seconds. It is noted that the aerial unit can lift the equipment to heights that differ from thirty meters and during a period that differs than ten seconds.

The system does not require a physical support for the aerial unit that performs the observation from the heights, since the aerial unit supports itself. Thus—the flexible cable can be light weighted since it doesn't need to support aerial unit.

Figure 12:
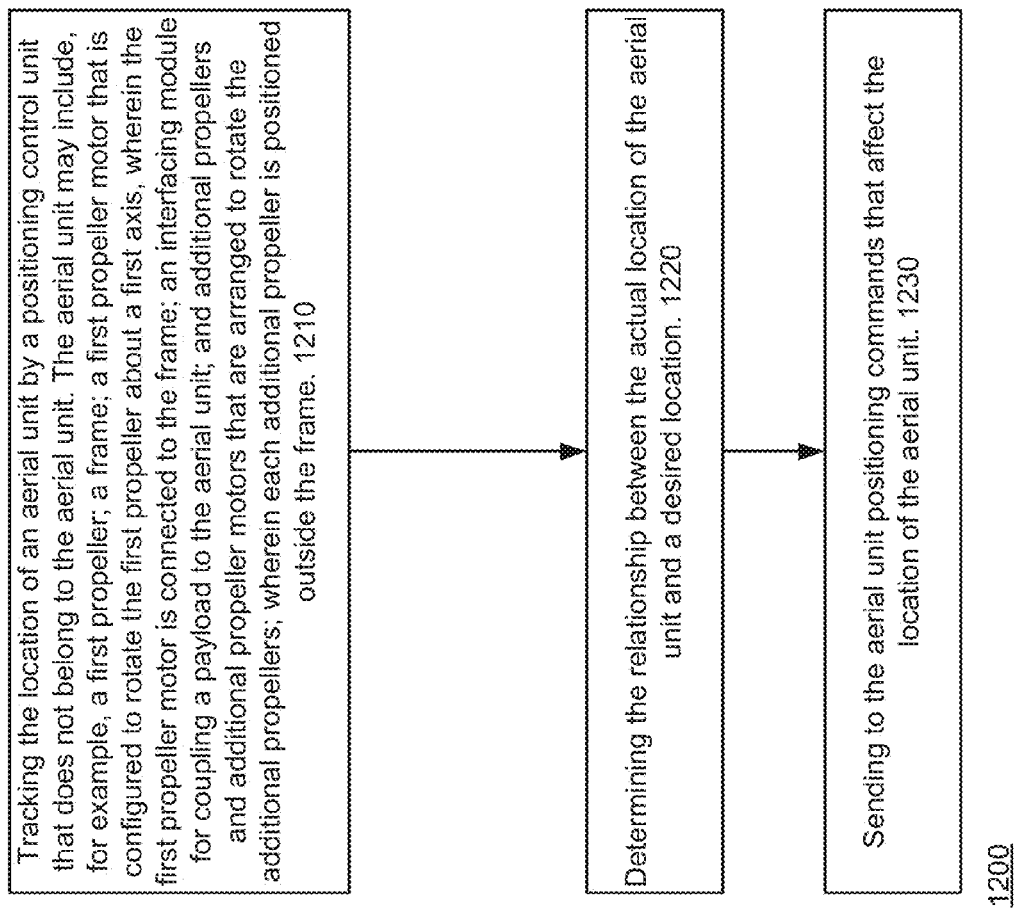
FIG. 12 is a flow chart of a method according to an embodiment of the invention.

FIG. 12 illustrates method 1200 according to an embodiment of the invention.

Method 1200 may start by stage 1210 of tracking the location of an aerial unit by a positioning control unit that does not belong to the aerial unit.

Stage 1210 may be followed by stage 1220 of determining the relationship between the actual location of the aerial unit and a desired location.

Stage 1220 may be followed by stage 1230 of sending to the aerial unit positioning commands that affect the location of the aerial unit. The aerial unit may belong to a system as illustrated above. It may include, for example, a first propeller; a frame; a first propeller motor that is configured to rotate the first propeller about a first axis, wherein the first propeller motor is connected to the frame; an interfacing module for coupling a payload to the aerial unit; and additional propellers and additional propeller motors that are arranged to rotate the additional propellers; wherein each additional propeller is positioned outside the frame.

The system can land an aerial unit during a landing process and lift the aerial unit during a takeoff process. The aerial unit and other parts of the ground unit are located within a housing during time periods between the landing and the takeoff processes—when the ground unit is folded.

The landing process includes a sequence of operations that are reversed during the takeoff process. Each operation may take place during a certain part of the landing process and a certain part of the takeoff process. These parts may be referred to as first part, second part, third part, fourth part, fifth, part, sixth part and the like. These parts can overlap, can partially overlap or can be non-overlapping.

Figure 13:
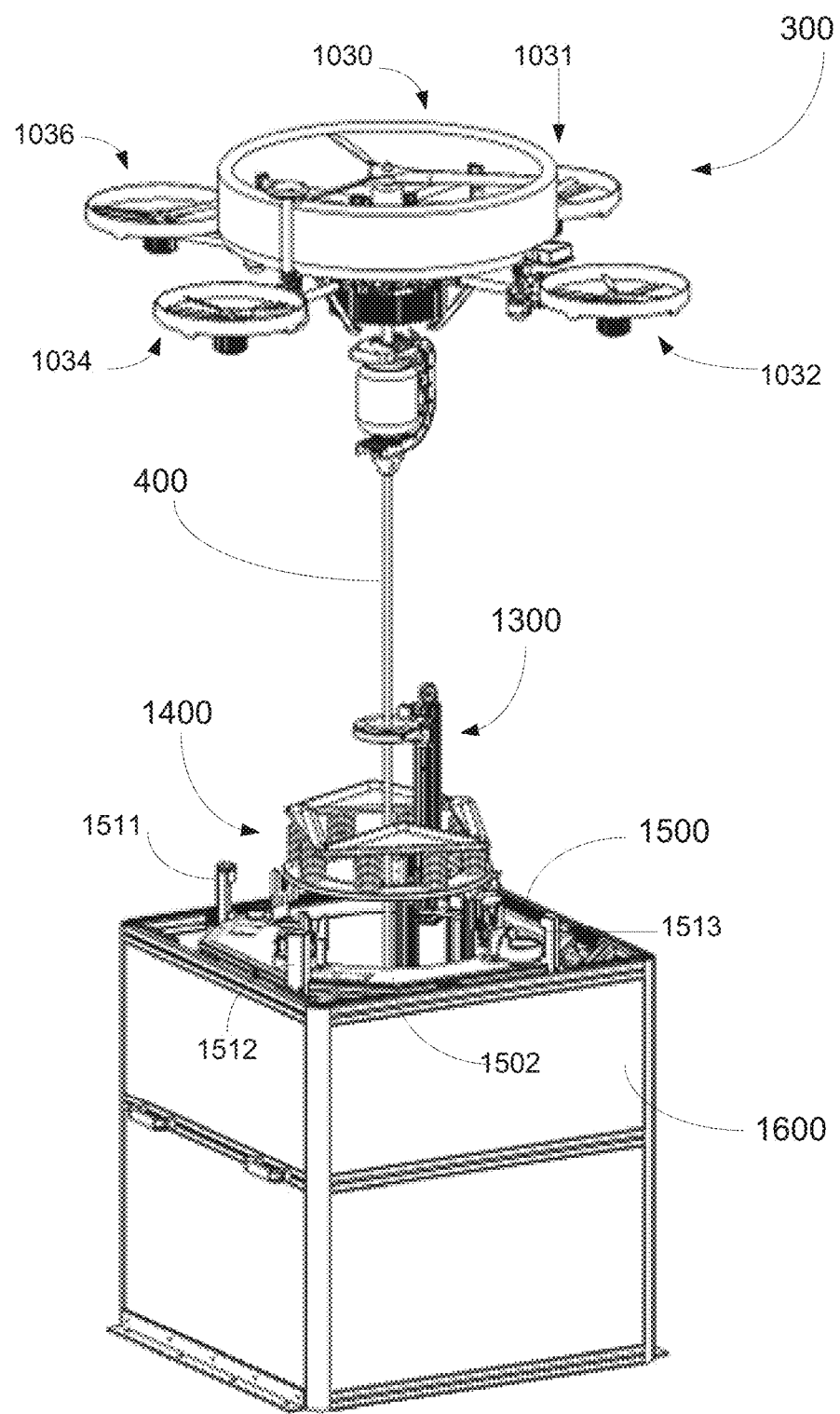
FIG. 13 illustrates a system according to an embodiment of the invention wherein the aerial unit is floating above the housing.

FIG. 13 illustrates a system 1000 according to an embodiment of the invention wherein the aerial unit 30 is floating above the housing 1600. The aerial unit is illustrated as including main propulsion module 1030 and four symmetrically distributed peripheral (or secondary) propulsion modules 1031, 1032, 1034 and 1036. The main propulsion module 1030 may include propellers such as propellers 310 and 330 of FIG. 8, main mast 320 of FIG. 8 and one or more main propeller motors.

Peripheral propulsion modules 1031, 1032, 1034 and 136 may include propellers 240, 342, 344 and 346 respectively, peripheral masts 321, 322, 324 and 326 and peripheral propeller motors 350, 352, 354 and 356 respectively.

The aerial unit 300 is connected to the base station via a connecting element such as cable 400.

The ground unit may include a takeoff and landing platform 1400, a landing and takeoff assisting module 1300, a foal and unfold module 1500 and a housing 1600.

The takeoff and landing platform 1400 may be arranged to hold and support aerial unit 300 during a first part of a landing process of the aerial unit 300 and a first part of takeoff process of the aerial unit 300. The effective length of the connecting element 400 increases during the takeoff process and decreases during the landing process.

The landing and takeoff assisting module 1300 is coupled to the takeoff and landing platform 1400 and is arranged to (a) lower the takeoff and landing platform 1400 into the housing during a second part of the landing process and (b) elevate the takeoff and landing platform 1400 during a second part of the takeoff process.

System 100 may include a connecting element manipulator (such as winch 211 of FIGS. 26-28), for altering the effective length of a connecting element 400. The effective length of the connecting element defines a distance between the ground unit and the aerial unit.

Figure 14:
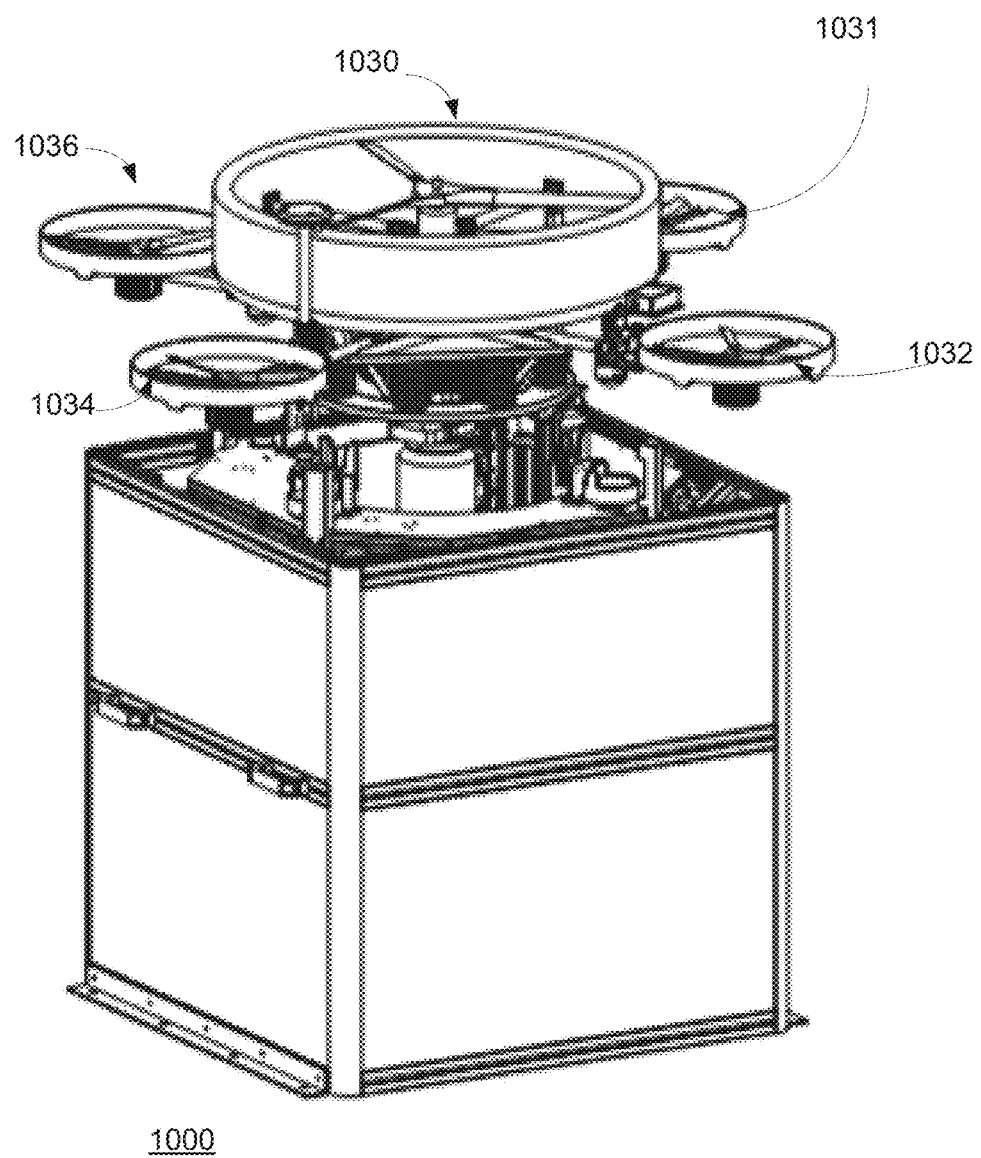
FIGS. 14-16 illustrates a system at various phases of the landing (or takeoff) process according to an embodiment of the invention.
Figure 15:
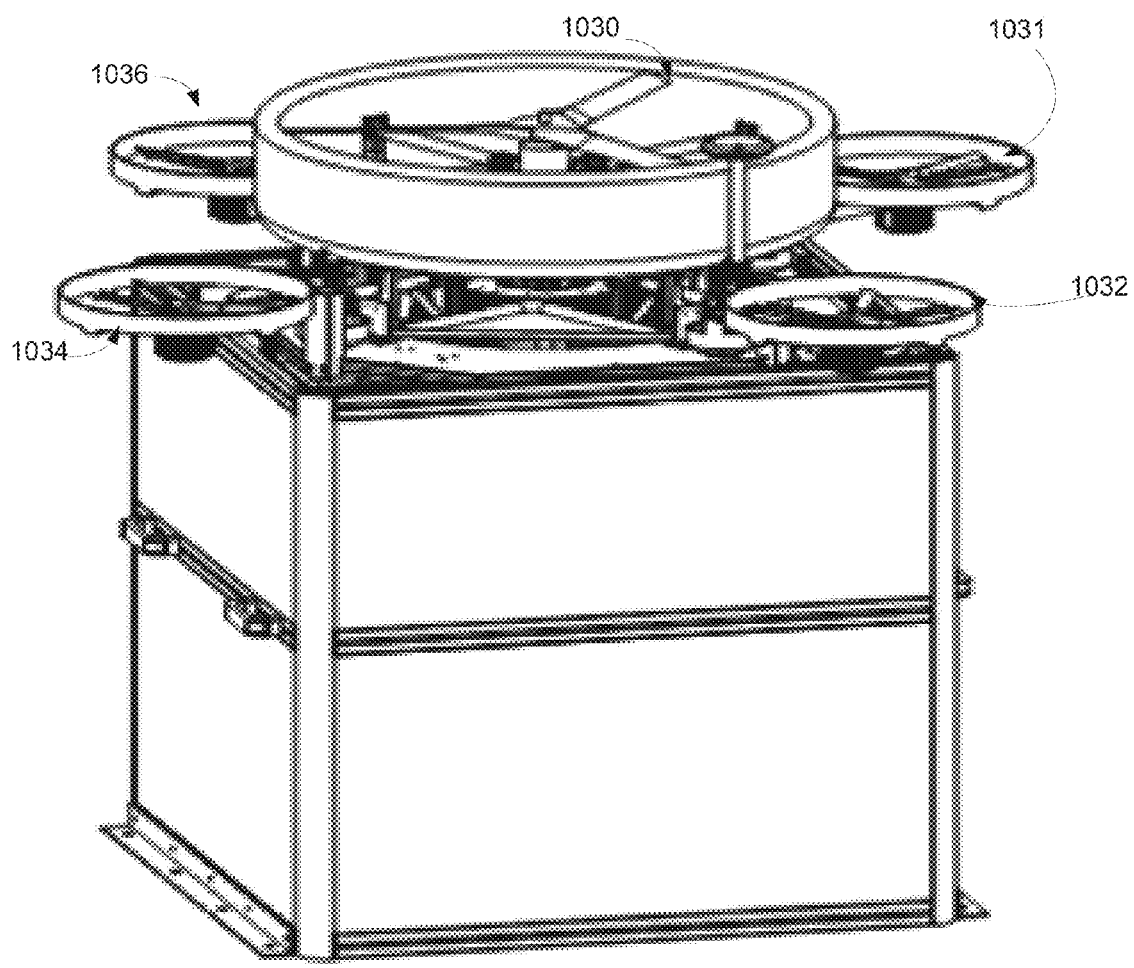
Figure 16:
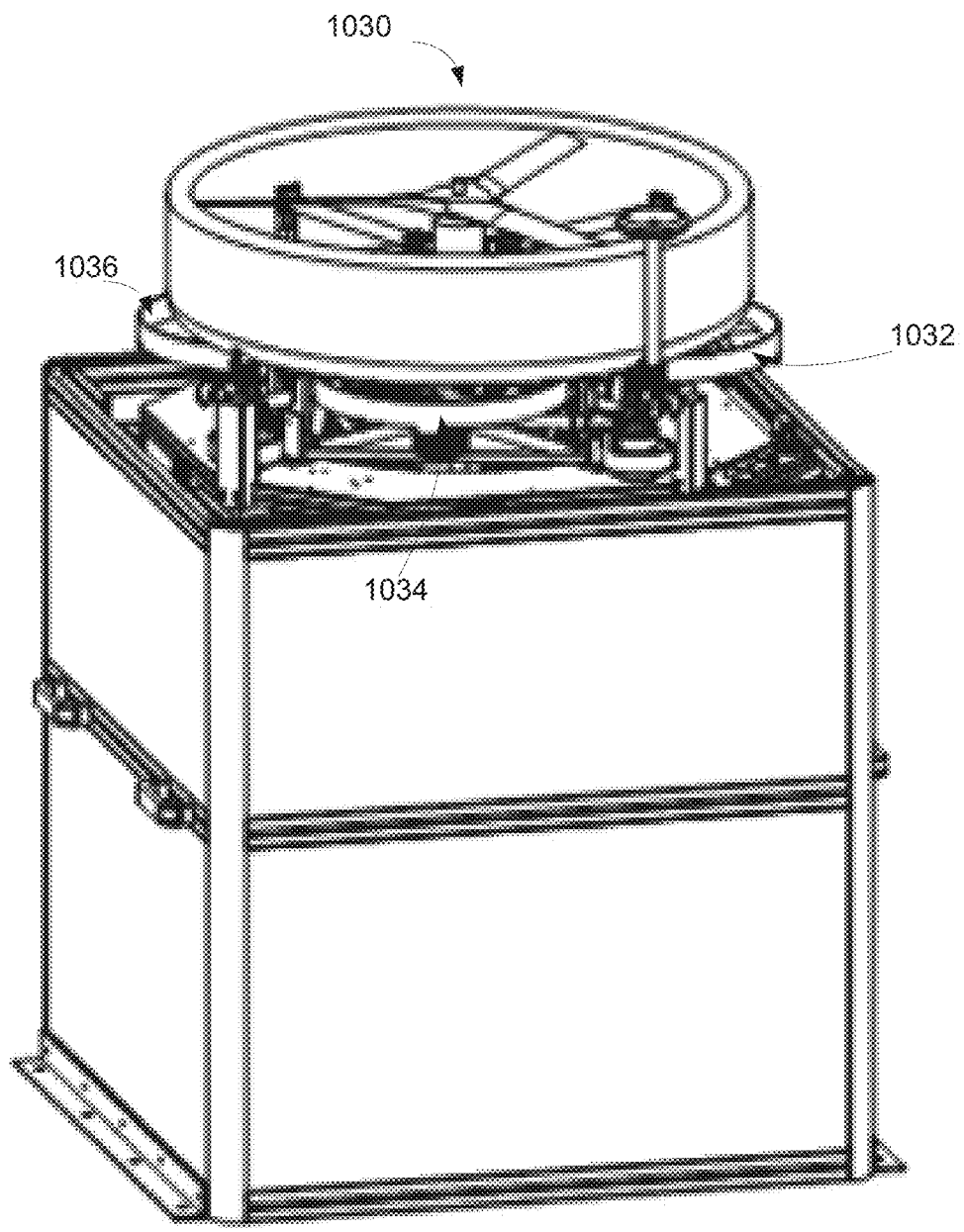
Figure 17:
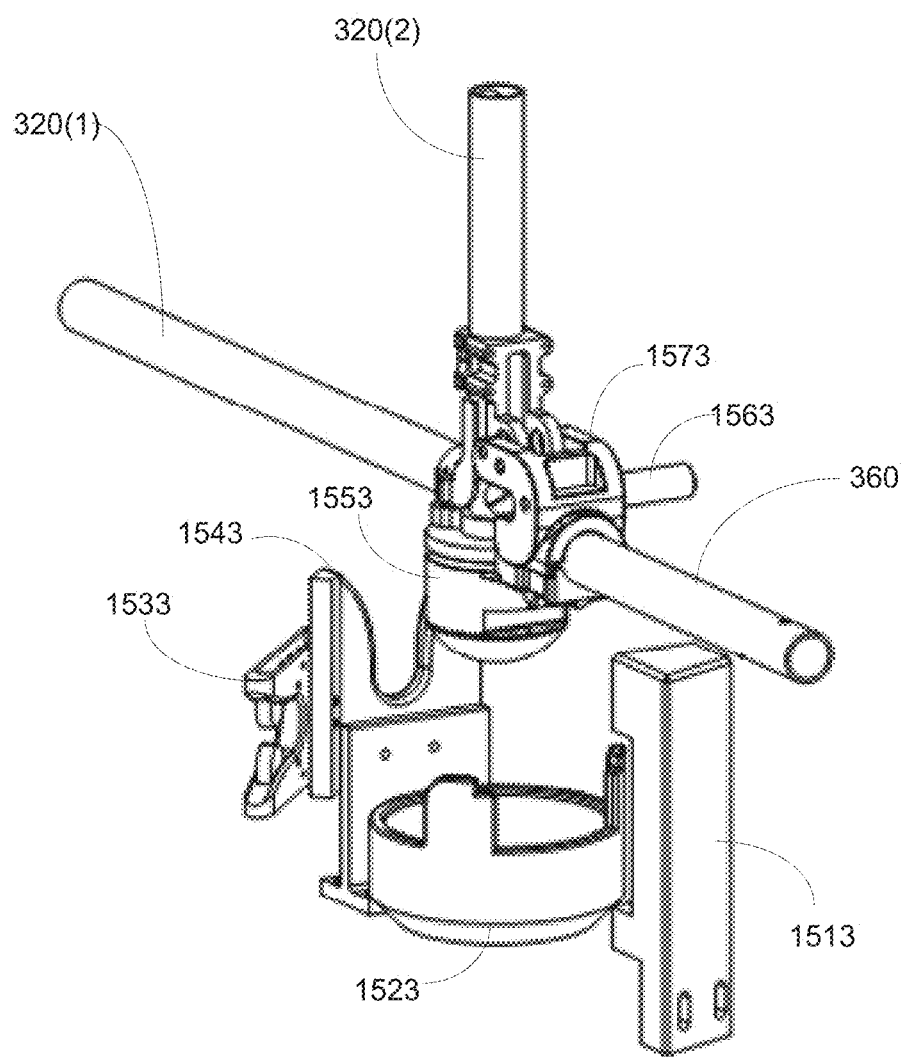
FIG. 17-19 illustrate a pivoting joint and various elements of the main and secondary frames at different points of time that correspond to the position of the aerial unit in FIGS. 14-16 according to various embodiments of the invention.
Figure 18:
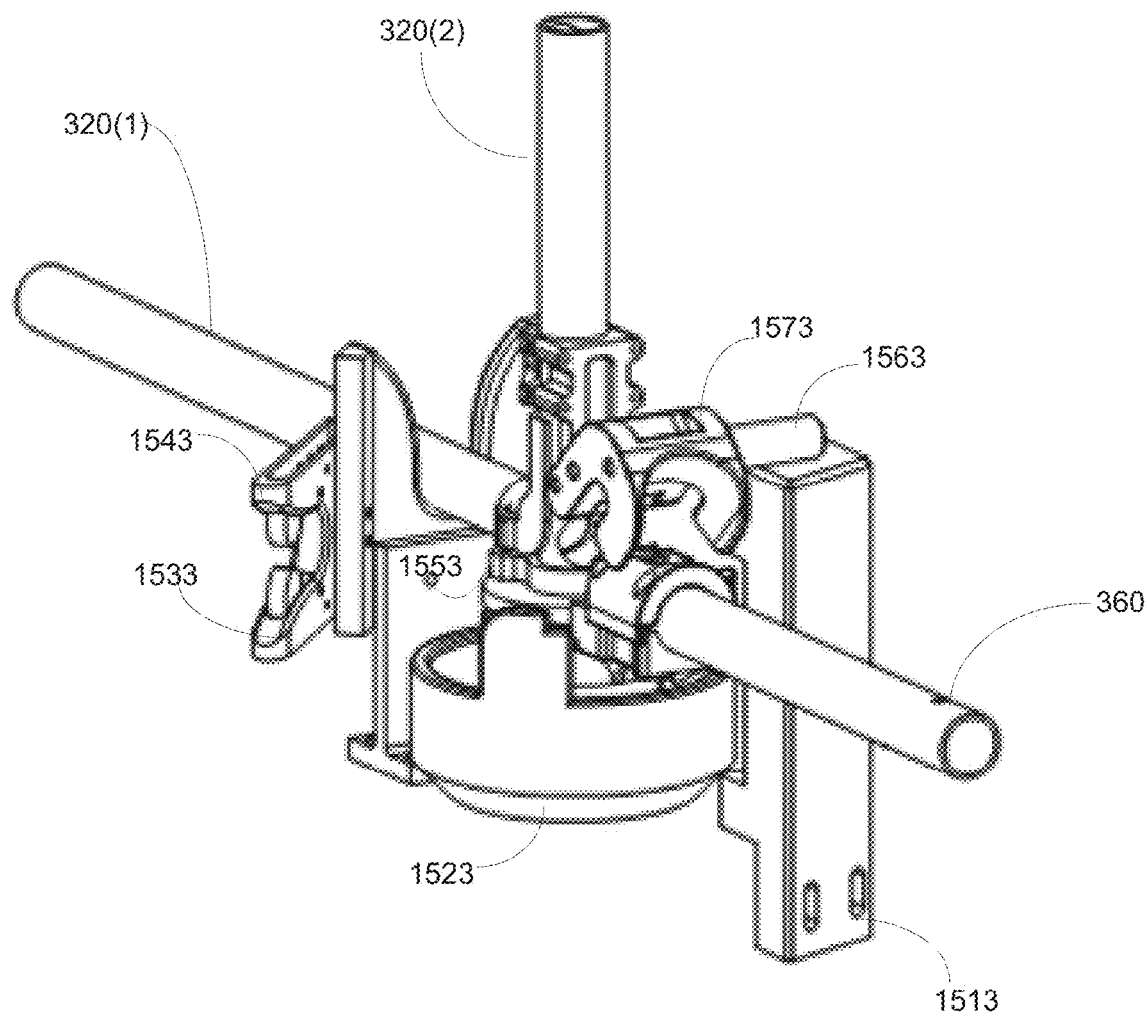
Figure 19:
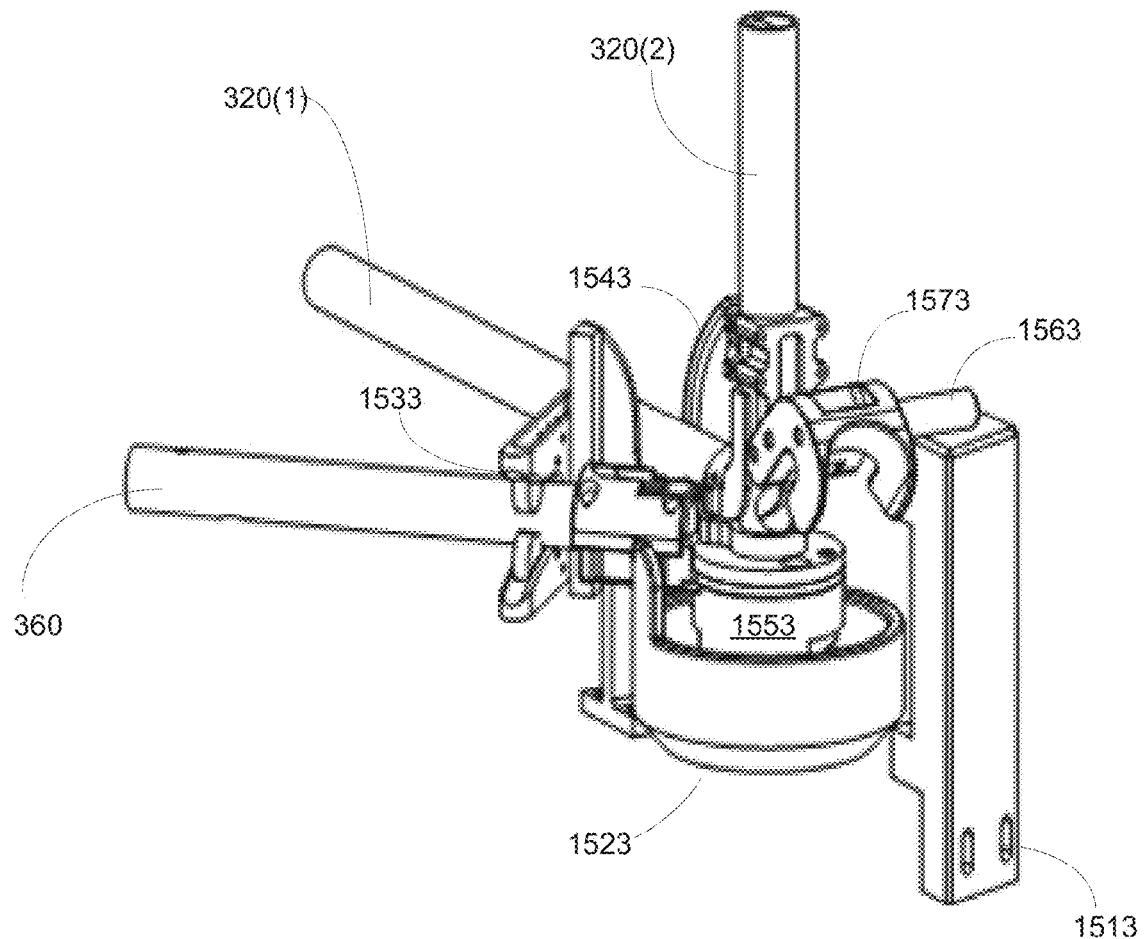
Figure 20:
FIG. 20 illustrates the system when the entire takeoff and landing platform and the landing and takeoff assisting module are within the housing according to an embodiment of the invention.
Figure 21:
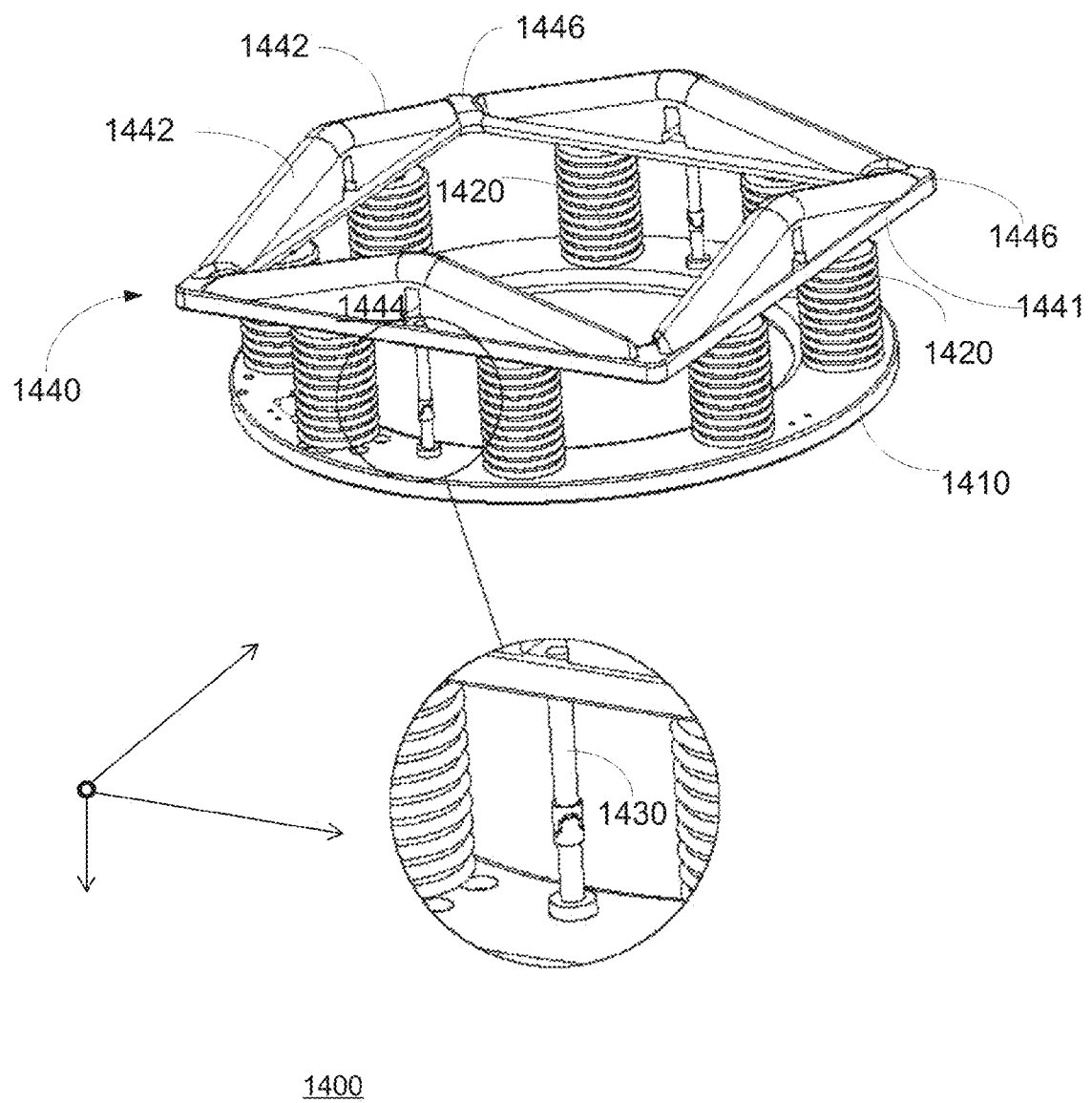
FIG. 21 illustrates the takeoff and landing platform according to an embodiment of the invention.

The aerial unit 300 includes a main propulsion module and multiple peripheral propulsion modules that extend outside the main propulsion module when the aerial unit hovers above the ground unit (as illustrated in FIG. 13). The fold and unfold unit 1500 is arranged to assist in reduction of a footprint of the aerial unit during a third part of the landing process by altering a spatial relationship between the main propulsion module and the peripheral propulsion modules. The footprint can be regarded as the area taken by the aerial unit. It may be reduced by folding the peripheral propulsion units beneath the main propulsion unit. This allows the aerial unit to fit inside the housing 1600. Referring to FIGS. 14 and 15—while the aerial unit is lowered from a first position (FIG. 14) to a second position (FIG. 15) while the peripheral propulsion modules are un-folded, when the aerial unit is lowered to a third position the peripheral propulsion units are folded beneath the main propulsion module (FIG. 16). FIGS. 17, 18 and 19 illustrate the position of a pivoting joint 1553 according to an embodiment of the invention when the aerial unit is at the first, second and third positions respectively.

Each peripheral propulsion module is coupled to the frame of the aerial unit via a pivoting joint that is selectively locked by a locking element. FIG. 17 illustrates the pivoting joint 1553, a horizontal bar 320(1) and a vertical bar 320(2) of the main frame 320, a horizontal bar 360 that is connected to a peripheral propulsion module 1032, a locking element 1573 that locks the pivoting joint 1553 (and prevents it from moving). The fold and unfold unit 1500 is arranged to unlock the locking element 1573 during a fourth part of the landing process and to rotate (by rotating engine 1523) the horizontal bar 360 that is connected to the pivoting joint 1553 and to the peripheral propulsion module 1032 to rotate and thereby reduce the footprint of the aerial unit. The rotating engine 1523 is illustrated as having an upper bar that contacts horizontal bar 360. It may have a pair of bars—one from each side of the horizontal bar.

The locking element 1553 is unlocked by allowing a locking element lifting module 1513 to lift bar 1563 that connected to the locking 1573. The bar is lifted as the aerial unit is lowered during the landing process while the locking element lifting module 1513 is stationary.

The fold and unfold unit 1500 may include a main holder 1543 that may be arranged to hold a part of a main frame (320(1)) of the main propulsion module during a fifth part of the landing process and a secondary holder 1533 for holding a part of a peripheral frame (360) of the peripheral propulsion module during a sixth part of the landing process.

All these operations are reversed during the takeoff process—the horizontal bar 360 (while is a part of the peripheral frame) is rotated from the secondary holder 1533 until the horizontal bar 360 is substantially parallel to horizontal bar 320(1) and the locking element 1573 locks the rotating joint 1553. The rotating joint rotates about a vertical axis while the locking element rotates about a horizontal axis.

FIGS. 21-25 illustrate takeoff and landing platforms 1400 and 1400" according to various embodiments of the invention.

The takeoff and landing platform 1400 is arranged to firmly hold the aerial unit 300 against the pulling force of the cable 400 by the winch 211 and the retracing force of the springs during the takeoff process and to allow initial takeoff direction (vertical) even when the ground unit is not leveled. During the landing process the takeoff and landing platform 1400 is arranged to absorb the landing force applied by the aerial unit 300 on impact and to align the aerial unit 300 so that the center of the aerial unit 300 and the center of the takeoff and landing platform 1400 is aligned.

Figure 22:
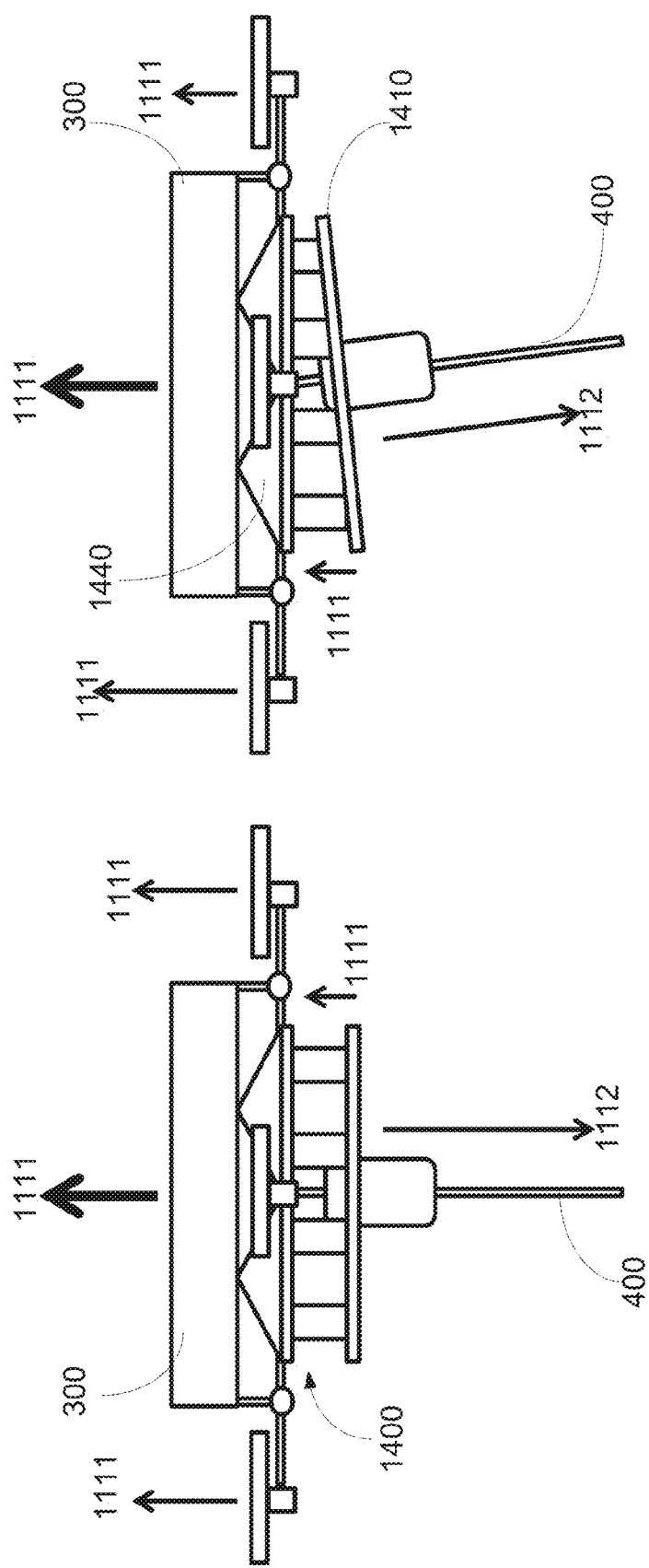
Figure 23:
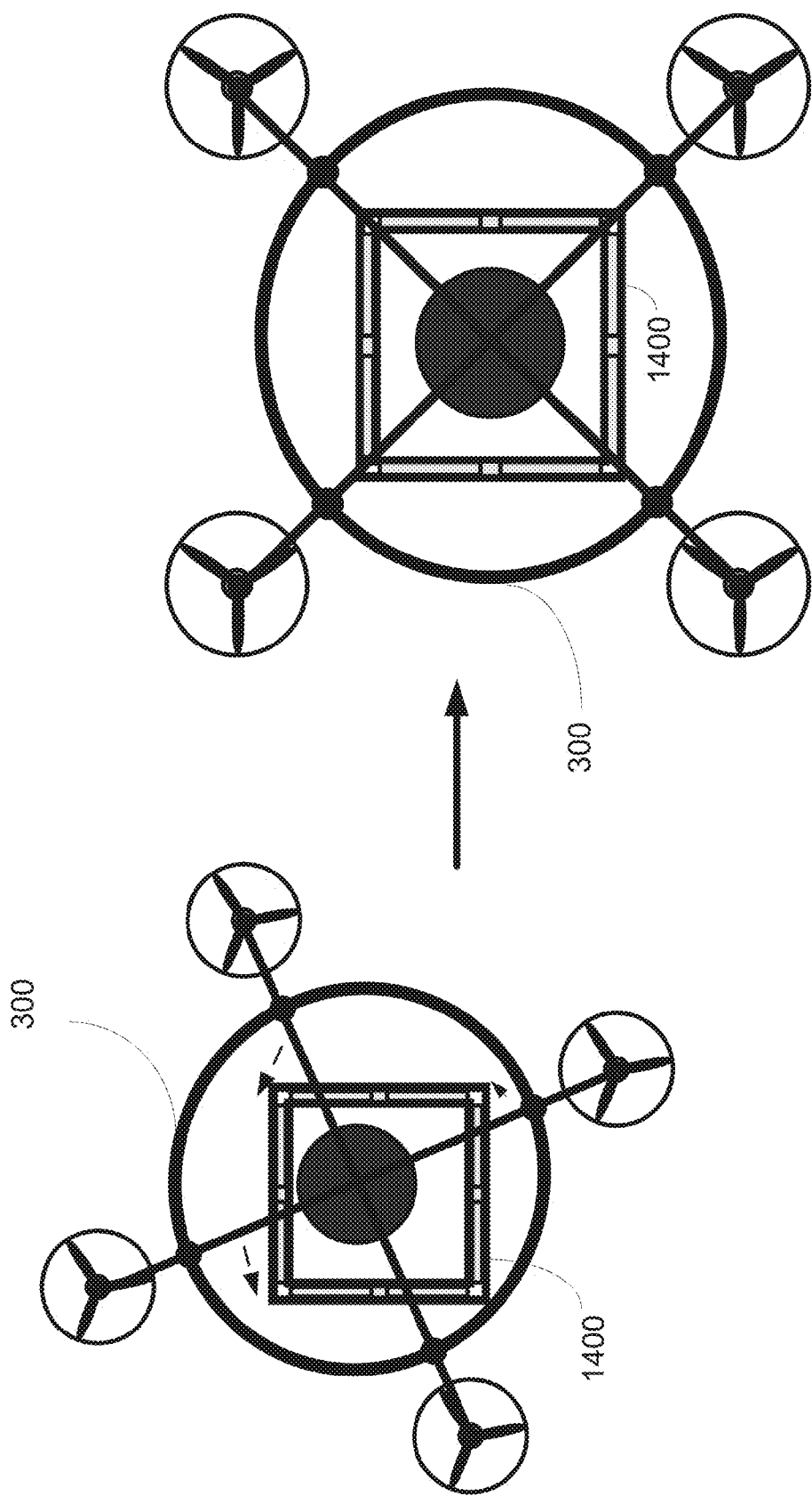

The takeoff and landing platform 1400 includes a base element (such as ring shaped base element 1410) that is positioned below a centering and positioning frame 1440 and coupling elements such as springs 1420 that couple the centering and positioning frame 1440 and the base element 1410 while allowing relative movement between the centering and positioning frame 1440 and the base element 1410. The relative movement may involve a change in the relative angle (orientation) between the base element 1410 and the centering and positioning frame 1440. This relative change may be introduced by a the aerial unit 300 (for example—when the aerial unit 300) fir contacts the centering and positioning frame 1440 in an asymmetrical (non-aligned, not-centered) manner. Additionally or alternatively—this may allow the centering and positioning frame 1440 to be horizontal even when the ground unit is not horizontal—thus the aerial unit 300 can lift off in a horizontal manner even when the base element 1410 is tilted in relation to the horizon. FIG. 22 illustrates leveled and non-leveled liftoff scenario and shows vertical lifting forces 1111 generated by the aerial unit 300 and vertical or non-vertical fraction 1112 that exists in cable 400.

The coupling elements comprise springs 1420 and may also include restraining elements 1444 for limiting a relative movement between the centering and positioning frame and the base element.

The aerial unit 300 includes four bottom frame elements that are located within the same imaginary horizontal plane and form a cross. The centering and positioning frame 1440 includes a bottom surface 1441 that has a rectangular shape—wherein each facet of the bottom surface supports a triangle 1444 that has its peak at the center of each facet and has is edges (minimal points 1446) at the four corners of the bottom surface 1441. The cross formed by the bottom frame elements is forced towards the minimal points of the triangles and thus aligned and centers the aerial unit 300.

Thus, the centering and positioning frame 1440 is shaped and positioned to force the bottom frame elements to be positioned at alignment positioned at a seventh part of the landing process.

The centering and positioning frame 1440 may include N symmetrical triangles that define N minimum points for receiving N bottom frame elements of the aerial unit. N may equal 4 of direct from 4.

The centering and positioning frame 1440 may be shaped in other manners (for example—it can form curved shapes) but in any case should be able to force the aerial unit to be placed at a centered manner at the end of the landing process.

FIGS. 24 and 25 illustrate takeoff and landing platforms 1400 and 1400" when the aerial unit 300" bottom frame elements 302" form a cone. Takeoff and landing platforms 1400" has a flat centering and positioning frame 1440".

The landing and takeoff assisting module 1300 may include a restraining element such as ring (1310) positioned at a center of the landing and takeoff assisting module 1300. The restraining element 1310 has an aperture through which the connecting element passes. It assists to maintain the connecting element 400 at substantially the center of landing and takeoff assisting module 1300 during landing.

The landing and takeoff assisting module 1300 may include a first selective movement force controlled element 1350 that is coupled to a first elevation element 1330 and to a second elevation element 1360. The first selective movement force controlled element is an element that may allow movement or prevent movement in response to the level of force applied on it.

The first selective movement force controlled element 1350 may be arranged to prevent relative elevation movement between the first and second elevation elements 1330 and 1360 when a force applied on the first selective movement force controlled element 1350 is below a first threshold and to allow relative elevation movement between the first and second elevation elements when the force applied on the first selective movement force controlled 1350 element exceeds the first threshold. These forces can be applied by the aerial unit and/or the connecting element 400 during different moments of the landing and/or takeoff process.

Figure 33:
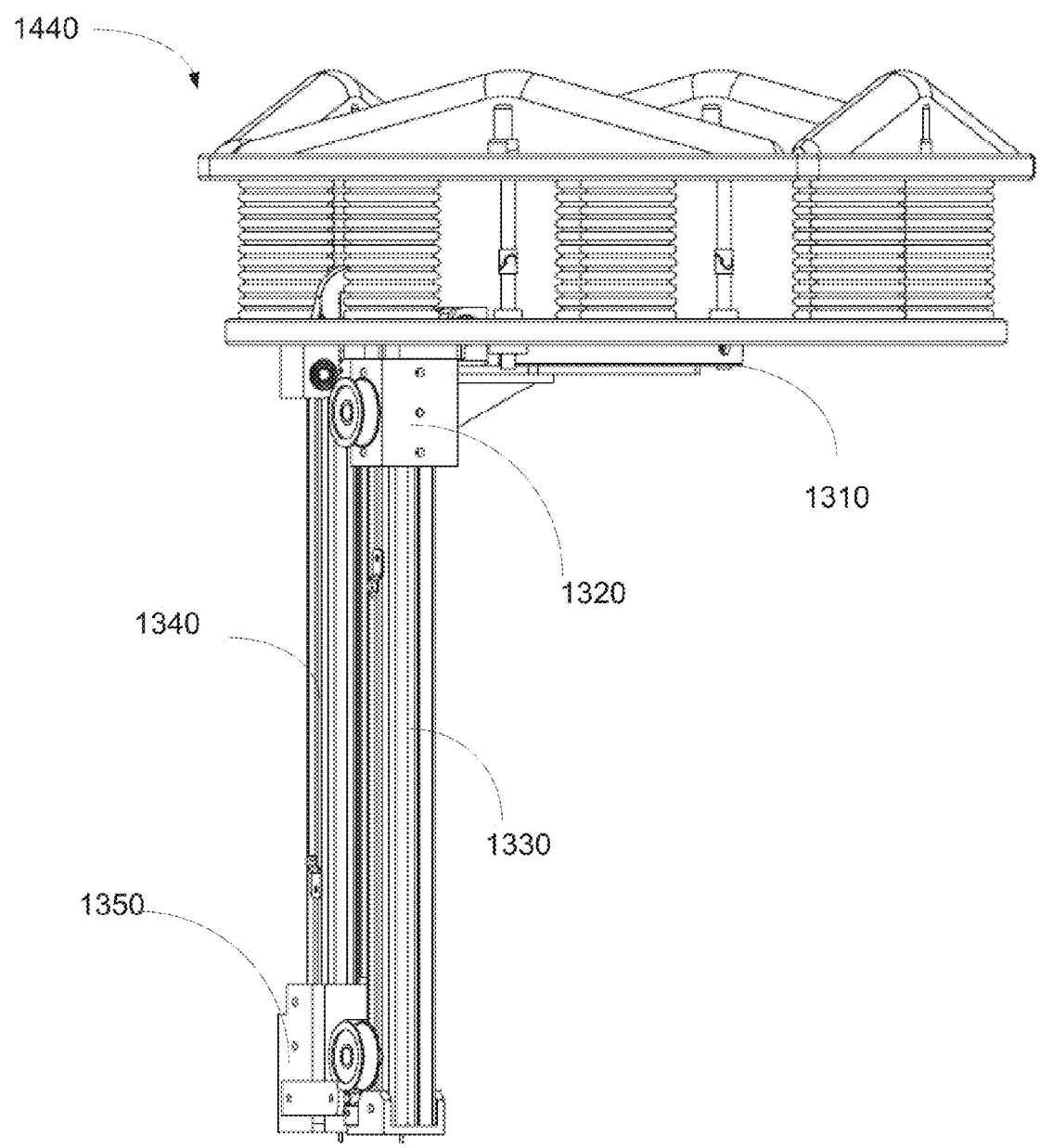
Figure 34:
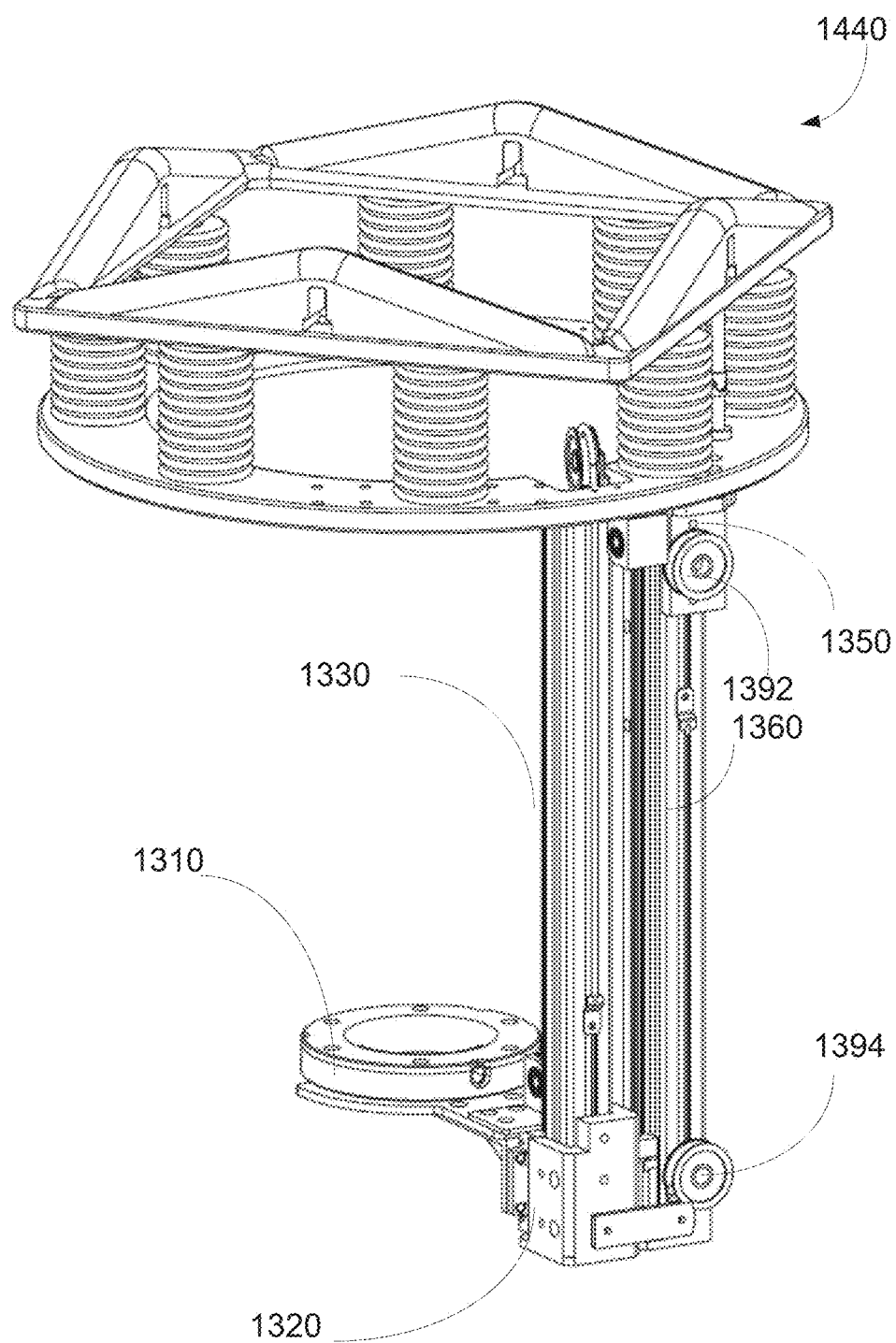

The restraining element 1310 and the first elevation element 1330 may be above the takeoff and landing platform 1400 at the beginning of the landing process (FIGS. 26, 29 and 32) be lowered beneath the takeoff and landing platform 1400 (FIGS. 27, 30 and 33) at a later part of the landing process. The restraining element 1310 can be further lowered towards the lower end of the first and second elevation elements 1330 and 1360 (FIGS. 28 and 34) at further stages of the landing process. This additional lowering is obtained by a second selective movement force controlled element 1320 connected between the restraining element 1310 and the first elevation element 1330.

Figure 32:
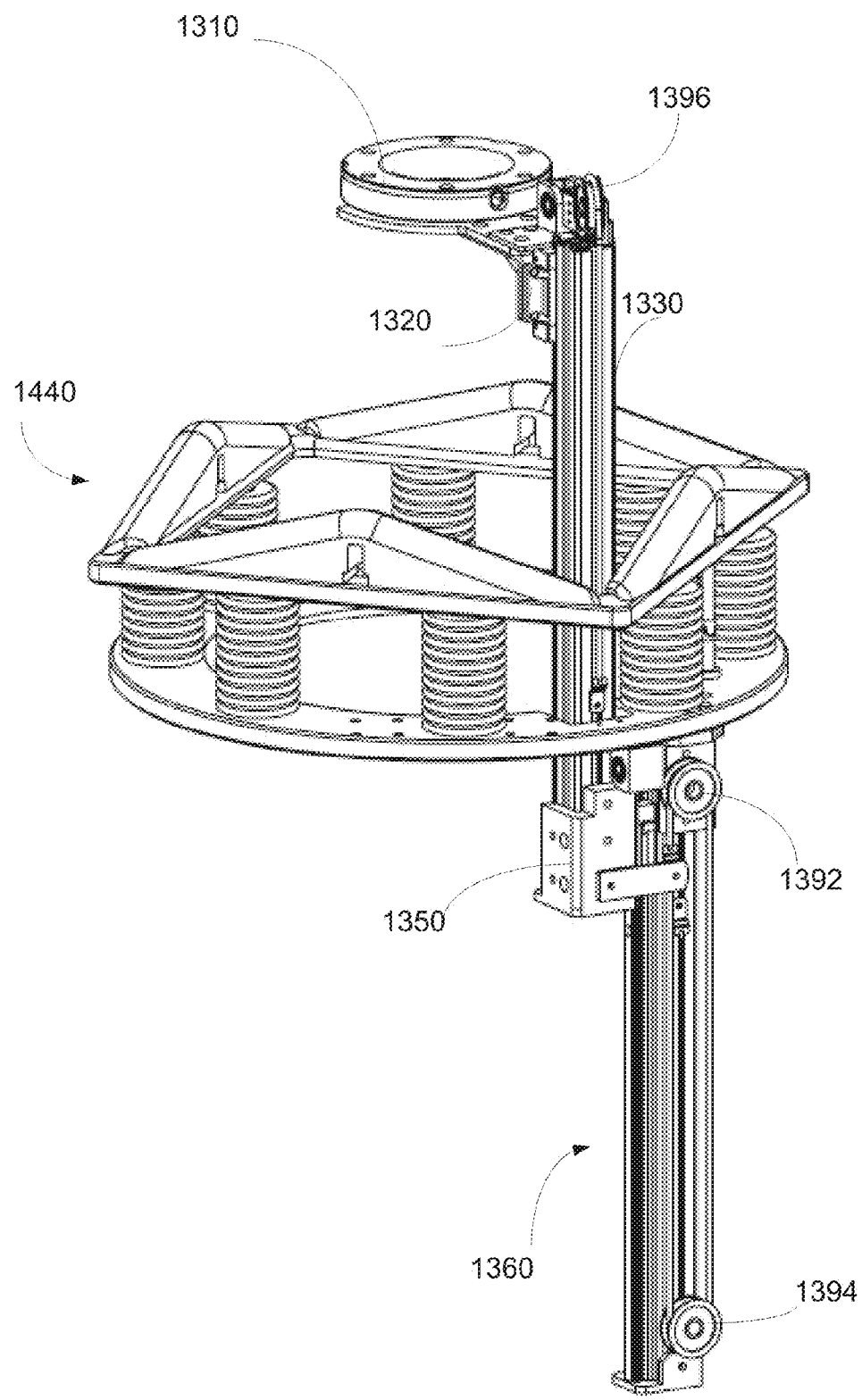
FIGS. 32-34 illustrate the takeoff and landing platform according to various embodiments of the invention.

The first and second elevation elements may be rails, or may include a combination of rails, rollers and cables (see, for example, rollers 1392, 1394 and 1396 of FIG. 32).

FIGS. 26-28 illustrate the forces applied on different elements of the landing and takeoff platform during landing.

These forces include: F(landing) 1720—force applied by aerial unit 300 during landing, F(J2) 1730=force applied on second selective movement force controlled element 1320, F(S1) 1740=force applied on first elevation element 1330, F(J1) 1750=force applied on first selective movement force controlled element 1350, F(S2) 1760=force applied on second elevation element 1360, F(hovering)=1710—elevation force produced by aerial unit, and F(Winch)=force applied by winch 211.

$$F(\text{Landing})=F(\text{Winch})-F(\text{Hovering})$$

$$F(\text{Landing})>[F(S2)+F(J1)]+[F(S1)+F(J2)]$$

$$[F(S2)+F(J1)]<[F(S1)+F(J2)]$$

$$F(J1)<F(J2)$$

It is noted that the forces applied on the first and second selective movement force controlled elements are zero once these elements are unlocked (and allow movement). These forces do not equal zero as long as these element prevent movement (are locked—positioned at their original portion). Accordingly, in FIG. 30 F(J1)=0 and in FIG. 31 F(J1) and F(J2)=0.

Figure 35:
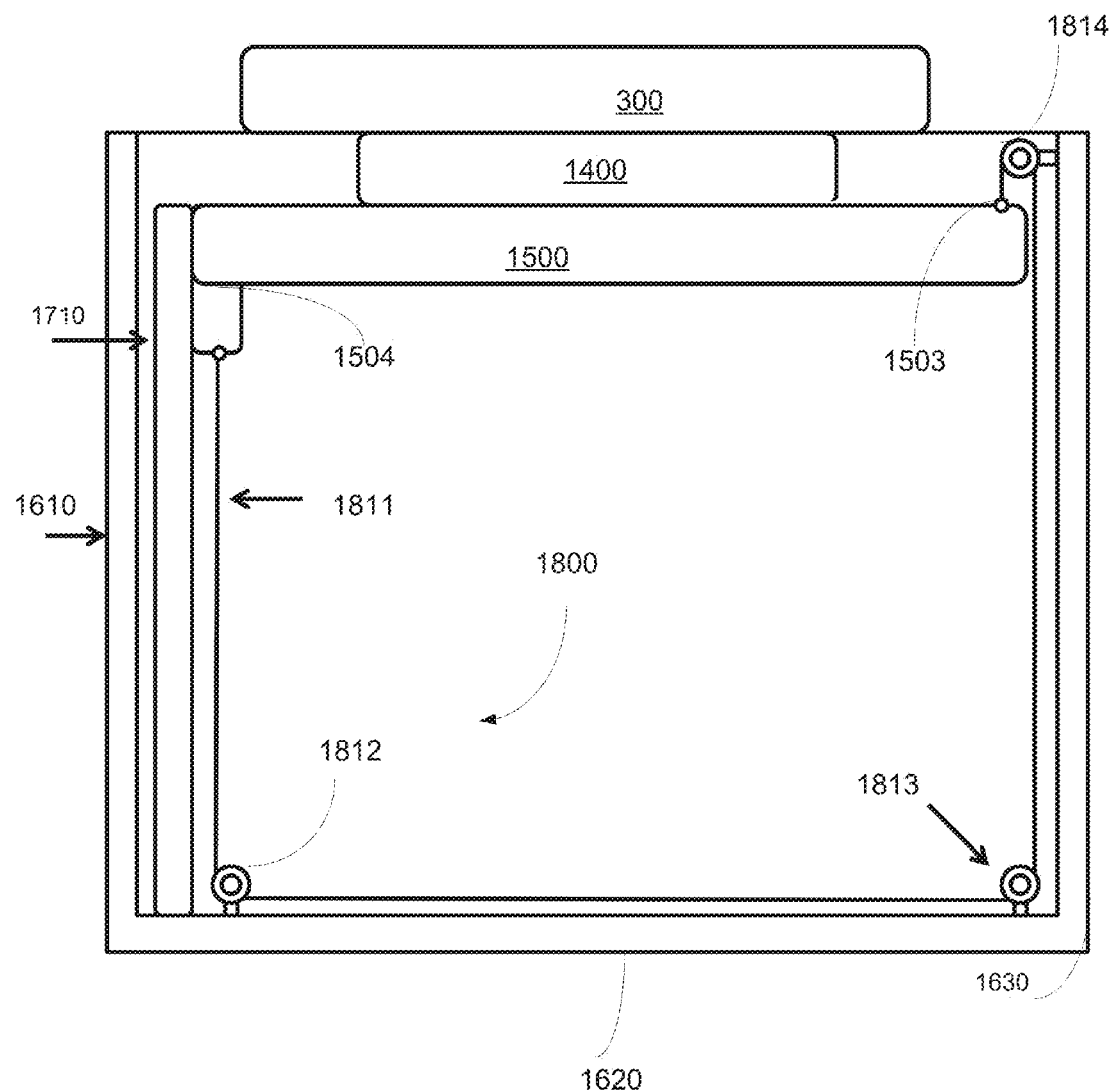
FIGS. 35-36 illustrate the housing, an elevation module and a force distribution module according to various embodiments of the invention.
Figure 36:
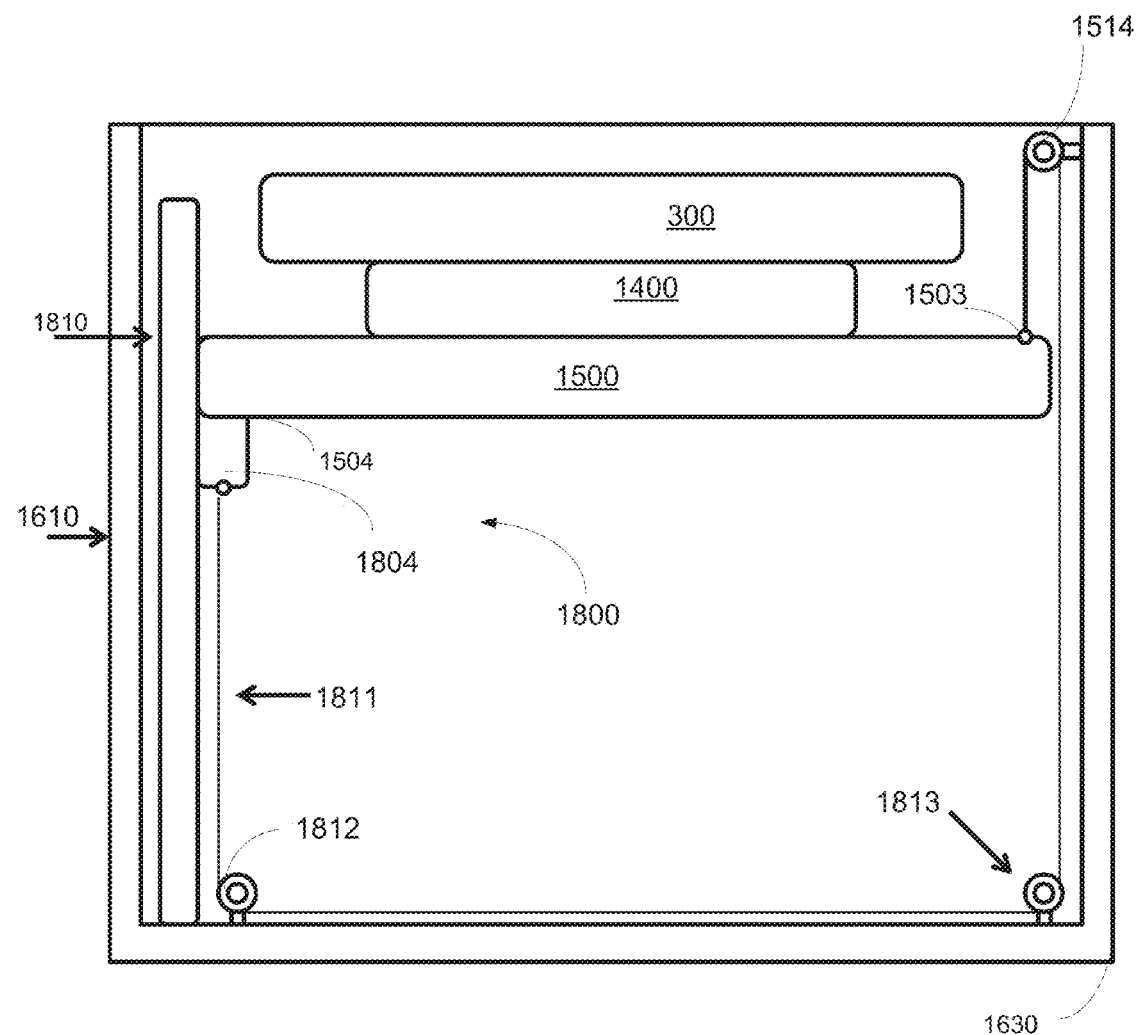

FIGS. 35-36 illustrate a cross section of the ground unit. These figures illustrate an elevation module 1810 (such as a motorized rail) that further lowers and lifts the takeoff and landing platform 1400 and the landing and takeoff assisting module 1500 within the housing 1600.

The elevation module 1810 contacts the folding and unfolding module 1500 at a certain location 1504 that may be proximate to the location of the first and second elevation elements 1330 and 1360 and thereby introduce uneven distribution of forces on the folding and unfolding module 1500. FIGS. 35-36 illustrate the system as including a force distribution module 1800 that is arranged to reduce an uneven distribution of forces applied on the folding and unfolding module by the elevation module.

The force distribution module 1800 contacts the folding and unfolding module 1500 by contact element 1804 at the certain location 1504 and also contact the folding and unfolding module 1500 at another location 1503 that is substantially opposite to the certain location 1504. If, for example, the certain location 1504 is located at the bottom of the right rear point of the folding and unfolding module 1500, then the other location can be positioned in proximity to the top of the front left point of the folding and unfolding module 1500. FIGS. 35-36 illustrate a cable 1811 that contacts the other point 1503 and the contacting element, the cable interfaces with winches and rollers 1812, 1813 (both located near the bottom 1620 of housing—one near sidewall 1610 and the other near sidewall 1630 of housing 1600) and 1814 (located near the top of the housing—in proximity to sidewall 1630).

FIG. 37 illustrates method 2000 according to an embodiment of the invention.

Method 2000 includes starts by stage 2010 of holding and supporting at aerial unit, by a takeoff and landing platform of a ground unit, during a first part of a landing process of the aerial unit. The aerial unit is coupled to the ground unit via a connecting element; wherein an effective length of the connecting element increases during the takeoff process and decreases during the landing process.

Stage 2010 may be followed by stage 2020 of lowering, by a landing and takeoff assisting module of the ground unit, the takeoff and landing platform into a housing of the ground unit, during a second part of the landing process.

Stage 2030 may be executed in parallel to stage 2010 and 2020 and may include reducing, by a connecting element manipulator, the effective length of the connecting element during the landing process. The effective length of the connecting element defines a distance between the ground unit and the aerial unit.

Stage 2040 may be executed during the execution of stage 2020 and may include reducing, by a fold and unfold unit, the footprint of the aerial unit by altering a spatial relationship between the main propulsion module and the peripheral propulsion modules. This can be done by rotating frame element that connect a main propulsion module of the aerial unit to peripheral propulsion modules of the aerial unit.

These stages may be reversed during the takeoff. Method 2000 may be executed by system 1000. Any operation that is executed by any element of system 100 can be included in method 2000. For example, the locking of the locking element and releasing the pivoting joint, aligning the aerial unit, lowering (or elevating) elements of system 100 within the housing, force distribution, the control of movement by selective movement force controlled elements, and the like.

Although the invention has been described in conjunction with specific embodiments thereof, it is evident that many alternatives, modifications and variations will be apparent to those skilled in the art, accordingly, it is intended to embrace all such alternatives, modifications and variations that fall within the spirit and broad scope of the appended claims.

We claim:

1. A system, comprising:
    a ground unit that comprises:
        a takeoff and landing platform;
        a landing and takeoff assisting module; and
        a housing;
        a fold and unfold unit;
    wherein the takeoff and landing platform is arranged to hold and support an aerial unit during a first part of a landing process of the aerial unit and a first part of takeoff process of the aerial unit; wherein the aerial unit is coupled to the ground unit via a connecting element; wherein an effective length of the connecting element increases during the takeoff process and decreases during the landing process;
    wherein the landing and takeoff assisting module is coupled to the takeoff and landing platform and is arranged to (a) lower the takeoff and landing platform into the housing during a second part of the landing process and (b) elevate the takeoff and landing platform during a second part of the takeoff process; and
    wherein the fold and unfold unit is arranged to assist in reduction of a footprint of the aerial unit during a third part of the landing process by altering a spatial relationship between a main propulsion module of the aerial unit and peripheral propulsion modules of the aerial unit; wherein the multiple peripheral propulsion modules extend outside the main propulsion module when the aerial unit hovers above the ground unit.

2. The system according to claim 1, comprising a connecting element manipulator, for altering the effective length of a connecting element; wherein the effective length of the connecting element defines a distance between the ground unit and the aerial unit.

3. The system according to claim 1, wherein each peripheral propulsion modules is coupled to the a frame of the aerial unit via a pivoting joint that is selectively locked by a locking element; wherein the fold and unfold unit is arranged to unlock the locking element during a fourth part of the landing process and to rotate the pivoting joint thereby causing the peripheral propulsion module to rotate and thereby reduce the footprint of the aerial unit.

4. The system according to claim 3 wherein the fold and unfold unit comprises a locking element lifting module that is arranged to lift the locking element during the fourth part of the landing process; a rotating module for rotating the pivoting joint and thereby causing the peripheral propulsion module to rotate.

5. The system according to claim 4 wherein the fold and unfold unit further comprise a main holder that is arranged to hold a part of a main frame of the main propulsion module during a fifth part of the landing process and a secondary holder for holding a part of a peripheral frame of the peripheral propulsion module during a sixth part of the landing process.

6. The system according to claim 1, wherein the takeoff and landing platform comprises a base element that is positioned below a centering and positioning frame and coupling elements that coupled the centering and positioning frame and the base element and couple while allowing relative movement between the centering and positioning frame and the base element.

7. The system according to claim 6, wherein the coupling elements comprise springs.

8. The system according to claim 7, wherein the coupling elements further comprise restraining elements for limiting a relative movement between the centering and positioning frame and the base element.

9. The system according to claim 6, wherein the coupling elements facilitate changes in a relative orientation between the centering and positioning frame and the base element.

10. The system according to claim 1, wherein the aerial unit comprise bottom frame elements; wherein the takeoff and landing platform comprises a centering and positioning frame that is shaped and positioned to force the bottom frame elements to be positioned at an alignment position at a seventh part of the landing process.

11. The system according to claim 10, wherein the bottom frame element are positioned in an imaginary flat plane and wherein the centering and positioning frame has upper edges that define maximum points and minimum points; and wherein the minimum points form the alignment position.

12. The system according to claim 11, wherein the centering and positioning frame comprises N symmetrical triangles that define N minimum points for receiving N bottom frame elements of the aerial unit.

13. The system according to claim 1, wherein the landing and takeoff assisting module comprises a restraining element positioned at a center of the landing and takeoff assisting module; wherein the restraining element has an aperture through which the connecting element passes.

14. The system according to claim 13, wherein the landing and takeoff assisting module comprises a first selective movement force controlled element that is coupled to a first elevation element and to a second elevation element; wherein the first selective movement force controlled element is arranged to prevent relative elevation movement between the first and second elevation elements when a force applied on the first selective movement force controlled element is below a first threshold and to allow relative elevation movement between the first and second elevation elements when the force applied on the first selective movement force controlled element exceeds the first threshold.

15. The system according to claim 14, wherein the first elevation element is coupled to the restraining element.

16. The system according to claim 15, wherein the first elevation element is coupled to the restraining element via a second selective movement force controlled element.

17. The system according to claim 1, comprising an elevation module that is arranged to lower and lift the takeoff and landing platform and landing and takeoff assisting module within the housing.

18. The system according to claim 17, wherein the elevation module contacts the fold and unfold unit and wherein the system comprises a force distribution module that is arranged to reduce an uneven distribution of forces applied on the folding and unfolding module by the elevation module.

19. The system according to claim 18, wherein the elevation module contacts the folding and unfolding module at a certain location and wherein the force distribution module contacts the fold and unfold unit at a location that is opposite to the certain location.

20. The system according to claim 1, further comprising the aerial unit.

21. The system according to claim 20, wherein each peripheral propulsion modules is coupled to the frame of the aerial unit via a pivoting joint that is selectively locked by a locking element; wherein a rotation of the pivoting joint causes the peripheral propulsion module to rotate and thereby reduce the footprint of the aerial unit.

22. A method, comprising:
holding and supporting an aerial unit, by a takeoff and landing platform of a ground unit, during a first part of a landing process of the aerial unit and a first part of takeoff process of the aerial unit; wherein the aerial unit is coupled to the ground unit via a connecting element; wherein an effective length of the connecting element increases during the takeoff process and decreases during the landing process;
assisting, by a fold and unfold unit of the ground unit, in a reduction of a footprint of the aerial unit during a third part of the landing process by altering a spatial relationship between a main propulsion module of the aerial unit and peripheral propulsion modules of the aerial unit; wherein the multiple peripheral propulsion modules extend outside the main propulsion module when the aerial unit hovers above the ground unit;
lowering, by a landing and takeoff assisting module of the ground unit, the takeoff and landing platform into a housing of the ground unit, during a second part of the landing process;
elevating the takeoff and landing platform during a second part of the takeoff process.

* * * * *